United States Patent
Eun et al.

(10) Patent No.: US 12,436,697 B2
(45) Date of Patent: Oct. 7, 2025

(54) STORAGE DEVICE AND METHOD OF OPERATING THE SAME

(71) Applicant: SAMSUNG ELECTRONICS CO., LTD., Suwon-si (KR)

(72) Inventors: Hee Seok Eun, Suwon-si (KR); Soo-Young Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 18/066,248

(22) Filed: Dec. 14, 2022

(65) Prior Publication Data

US 2023/0409219 A1     Dec. 21, 2023

(30) Foreign Application Priority Data

Jun. 16, 2022   (KR) .................. 10-2022-0073258

(51) Int. Cl.
G06F 3/06       (2006.01)

(52) U.S. Cl.
CPC ............ G06F 3/064 (2013.01); G06F 3/0604 (2013.01); G06F 3/0631 (2013.01); G06F 3/0679 (2013.01)

(58) Field of Classification Search
CPC ...... G06F 3/064; G06F 3/0604; G06F 3/0631; G06F 3/0679; G06F 3/0644; G06F 3/0688; G06F 3/061; G06F 3/0656; G06F 3/0665; G06F 12/0802; G06F 3/0662; G06F 12/0246
USPC ......................................................... 711/154
See application file for complete search history.

(56) References Cited

U.S. PATENT DOCUMENTS

| | | | |
|---|---|---|---|
| 10,628,594 B2 | 4/2020 | Himmel | |
| 10,768,820 B2 | 9/2020 | Subramanian et al. | |
| 10,782,993 B2 | 9/2020 | Rao et al. | |
| 11,159,366 B1 | 10/2021 | Gawade et al. | |
| 2019/0227718 A1* | 7/2019 | Frolikov | G06F 12/0246 |
| 2019/0391928 A1* | 12/2019 | Lin | G06F 12/1009 |
| 2020/0293451 A1 | 9/2020 | Choi et al. | |
| 2021/0004333 A1 | 1/2021 | Jain et al. | |
| 2021/0073036 A1 | 3/2021 | Kim et al. | |
| 2022/0004418 A1 | 1/2022 | Choi | |
| 2023/0236763 A1* | 7/2023 | Wells | G06F 3/061 |
| | | | 711/154 |

OTHER PUBLICATIONS

Multiple Physical Function NVMe Device Commands Specification.
NVM Express® Base Specification Revision 2.0a, Jul. 23, 2021.
NVM Command Set Specification Revision 1.0a, Jul. 23, 2021.

* cited by examiner

*Primary Examiner* — Hua J Song
(74) *Attorney, Agent, or Firm* — MORGAN, LEWIS & BOCKIUS LLP

(57) ABSTRACT

A storage device includes a non-volatile memory including a plurality of namespaces including a plurality of logical blocks; and a storage controller configured to, for each of the plurality of namespaces, check a capacity that is a number of allocable logical blocks, among the plurality of logical blocks, and a size that is a sum of a number of currently allocated logical blocks, among the plurality of logical blocks, and the number of allocable logical blocks, detect a first namespace, among the plurality of namespaces, by using the capacity and the size, and provide at least a portion of the allocable logical blocks of a second namespace, among the plurality of namespaces, to the first namespace.

20 Claims, 19 Drawing Sheets

STORAGE DEVICE AND METHOD OF OPERATING THE SAME

CROSS-REFERENCE TO RELATED APPLICATION

This application claims priority under 35 U.S.C. § 119 to, and the benefit of, Korean Patent Application No. 10-2022-0073258 filed in the Korean Intellectual Property Office on Jun. 16, 2022, the entire contents of which are incorporated herein by reference.

TECHNICAL FIELD

The present disclosure relates to storage and, more specifically, to a storage device and a method of operating the same.

DISCUSSION OF THE RELATED ART

In recent years, as semiconductor technology has developed, the performance of computer processors has greatly increased, and as multi-core processor technology has developed, the amount of work that can be performed simultaneously in one computer server has increased significantly.

Accordingly, data centers install hundreds or thousands of computer servers in one place to reliably provide various services (for example, web servers, mail servers, file servers, video servers, and cloud servers) to different service users.

To satisfy Quality of Service (QoS) of a service provided to tenants requesting a connection to a data center, a storage device supporting a namespace function is used to efficiently use the storage device.

SUMMARY

A storage device includes a non-volatile memory including a plurality of namespaces including a plurality of logical blocks; and a storage controller configured to, for each of the plurality of namespaces, check a capacity that is a number of allocable logical blocks, among the plurality of logical blocks, and a size that is a sum of a number of currently allocated logical blocks, among the plurality of logical blocks, and the number of allocable logical blocks, detect a first namespace, among the plurality of namespaces, by using the capacity and the size, and provide at least a portion of the allocable logical blocks of a second namespace, among the plurality of namespaces, to the first namespace.

The storage controller may set a first ratio of the size of each of the plurality of namespaces to a first threshold, and detect a namespace having a capacity that is less than the first threshold, among the plurality of namespaces, as the first namespace.

The storage controller may determine the number of at least the portion of the allocable logical blocks of the second namespace so that the capacity of the second namespace, except for at least the portion of the allocable logical blocks of the second namespace, maintains at least the first threshold of the second namespace.

The storage controller may determine the number of at least the portion of the allocable logical blocks of the second namespace so that the capacity of the first namespace, to which at least the portion of the allocable logical blocks of the second namespace is provided, is greater than or equal to the first threshold.

The storage controller may set a second ratio of the size of each of the plurality of namespaces to a second threshold, and detect a namespace having a capacity greater than or equal to the second threshold, among the plurality of namespaces, as the second namespace.

The first ratio may be less than the second ratio.

When the capacity of the first namespace is greater than or equal to the second threshold, the storage controller may return at least a portion of the allocable logical blocks of the first namespace to the second namespace.

The storage controller may secure the allocable logical block of the first namespace by performing garbage collection on the first namespace.

When the capacity of the second namespace is less than the first threshold, the storage controller may detect whether the capacity of the first namespace is greater than or equal to the second threshold.

When the capacity of the second namespace is less than the first threshold, even after returning at least the portion of the allocable logical blocks of the first namespace to the second namespace, the storage controller may provide at least a portion of allocable logical blocks of a third namespace, among the plurality of namespaces, to the second namespace.

When the storage controller receives an identification command for the plurality of namespaces from an external source, the storage controller may output information on the capacity and information on the size of each of the plurality of namespaces.

The plurality of namespaces may include a plurality of third namespaces allocated to a plurality of virtual machines and a fourth namespace shared by the plurality of virtual machines, and the storage controller may determine the second namespace preferentially from among the fourth namespaces over the third namespace.

The storage device may further include a buffer memory having a plurality of memory areas allocated to the plurality of virtual machines, in which the storage controller may monitor QoS of the plurality of virtual machines to comply with QoS requirements of the plurality of virtual machines, and reconfigure free space of the plurality of memory areas according to the monitored QoS.

AA method of operating a storage device includes checking, for each of the plurality of namespaces including a plurality of logical blocks, a capacity that is a number of allocable logical blocks, among the plurality of logical blocks, and a size that is a sum of a number of currently allocated logical blocks, among the plurality of logical blocks, and the number of allocable logical blocks; detecting a first namespace, among the plurality of namespaces, by using the capacity and the size; and providing at least a portion of the allocable logical blocks of a second namespace, among the plurality of namespaces, to the first namespace.

The detecting of the first namespace may include setting a first ratio of the size of each of the plurality of namespaces to a first threshold; and detecting a namespace having a capacity that is less than the first threshold, among the plurality of namespaces, as the first namespace.

The method may further include setting a second ratio of the size of each of the plurality of namespaces to a second threshold; and detecting a namespace having a capacity greater than or equal to the second threshold, among the plurality of namespaces, as the second namespace.

The method may further include determining whether a capacity of the first namespace provided with at least the portion of the allocable logical blocks of the second namespace is greater than or equal to the second threshold; when the capacity of the first namespace is greater than or equal to the second threshold, securing the allocable logical block of the first namespace by performing garbage collection on the first namespace; and returning at least a portion of the allocable logical blocks of the first namespace to the second namespace.

A storage system includes a host device configured to execute the plurality of virtual machines; and a storage device including a plurality of namespaces allocated to a plurality of virtual machines, and configured to adjust a size of each of the plurality of namespaces based on the number of allocable logical blocks in each of the plurality of namespaces and the number of currently allocated logical blocks in each of the plurality of namespaces.

The storage device may further include a shared namespace shared by the plurality of virtual machines, and may adjust the size of each of the plurality of namespaces by using an allocable logical block of the shared namespace.

The storage device may further include a plurality of memory areas allocated to the plurality of virtual machines, and configured to monitor QoS of the plurality of virtual machines to comply with QoS requirements of the plurality of virtual machines, and reconfigure free space of the plurality of memory areas allocated to the plurality of virtual machines according to the monitored QoS.

DETAILED DESCRIPTION OF THE EXEMPLARY EMBODIMENTS

Figure 1:
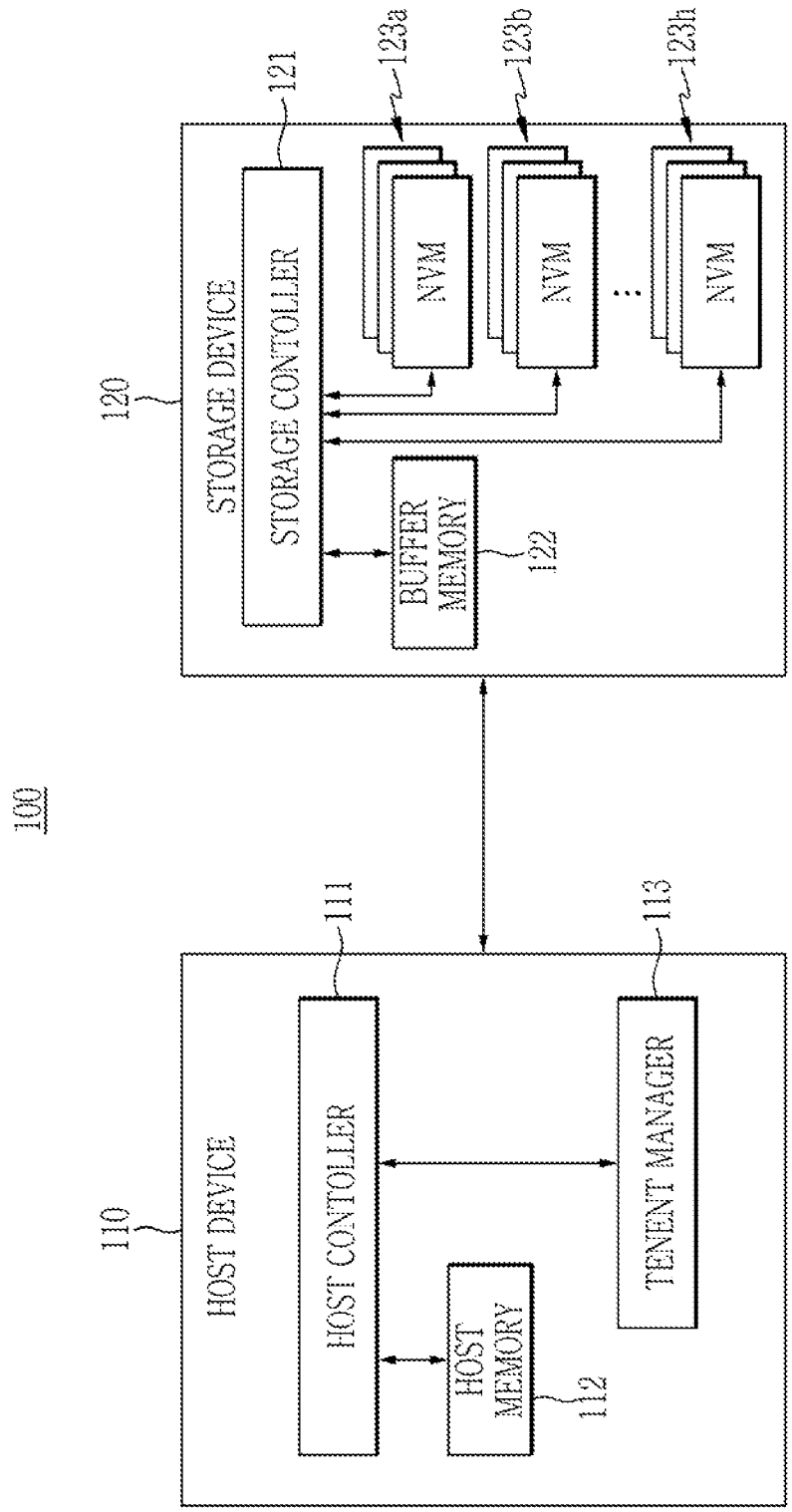
FIG. 1 is a block diagram illustrating a storage system according to an exemplary embodiment.

In the following detailed description, certain exemplary embodiments of the present invention have been shown and described, simply by way of illustration. As those skilled in the art would realize, the described exemplary embodiments may be modified in various different ways, all without departing from the spirit or scope of the present disclosure.

Like reference numerals may designate like elements throughout the specification and the drawings. In the flowchart described with reference to the drawing, the order of operations may be changed, several operations may be merged, some operations may be divided, and specific operations might not be performed.

In addition, expressions written in the singular may be construed in the singular or plural unless an explicit expression such as "a" or "single" is used. Terms including an ordinary number, such as first and second, may be used for describing various constituent elements, but the constituent elements are not necessarily limited by the terms. These terms may be used for the purpose of distinguishing one component from another.

FIG. 1 is a block diagram illustrating a storage system according to an exemplary embodiment.

Figure 2:
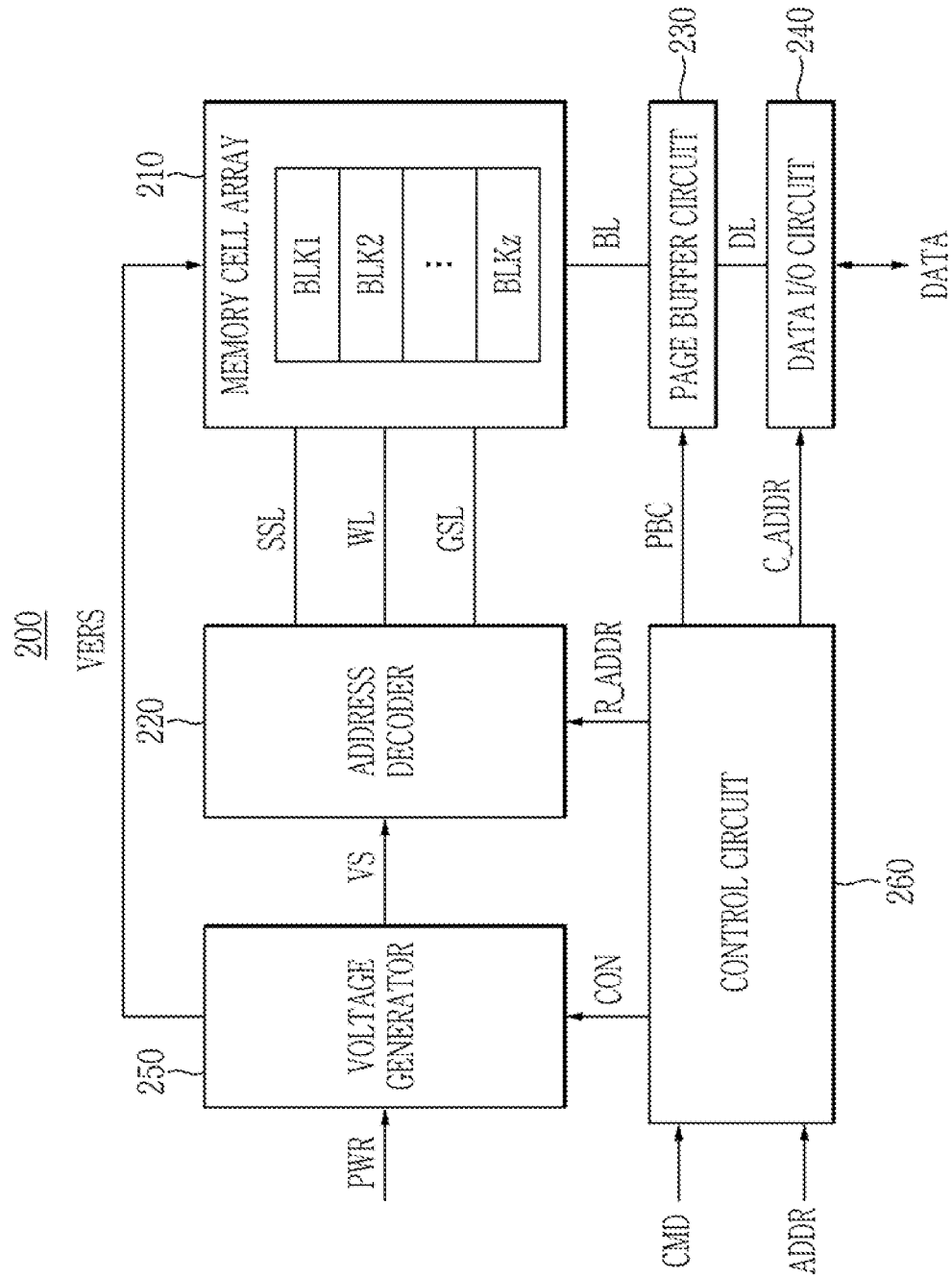
FIG. 2 is a block diagram illustrating an example of a non-volatile memory included in a storage device according to an exemplary embodiment.

Referring to FIG. 2, a storage system 100 includes a host device 110 and a storage device 120.

The host device 110 controls the overall operation of the storage system 100. For example, the host device 110 may include a host processor (or host controller) 111, a host memory 112, and a tenant manager 113.

The host processor 111 may control the operation of the host device 110 and execute, for example, an Operating System (OS). The host memory 112 may store instructions and data executed and processed by the host processor 111. For example, the OS executed by the host processor 111 may include a file system for file management and a device driver for controlling peripheral devices including the storage device 120 in the OS level.

The tenant manager 113 may store and modify information about a plurality of tenants managed by the host device 110. For example, the information on the plurality of tenants may include identification (ID) allocated to each of the plurality of tenants, and information on the priority of each of the plurality of tenants.

The tenant manager 113 may identify a tenant to which a user who requests a task from the host device 110 belongs. For example, when a plurality of users each request a task, the tenant manager 113 may transmit information on the ID and the priority of a tenant corresponding to each of the plurality of users to the storage device 120.

In some exemplary embodiments, the tenant manager 113 may be implemented as a hypervisor. The hypervisor is a logical platform for simultaneously executing a plurality of OSs operated for each tenant, and may be referred to as a Virtual Machine (VM) monitor or a virtual machine manager.

In the exemplary embodiment, the host device 110 may execute a plurality of different applications and/or a plurality of virtual machines running on an OS for each tenant.

The host device 110 may communicate with the storage device 120 through various interfaces. As an example, the host device 110 may communicate with the storage device 120 through various interfaces, such as Universal Serial Bus (USB), MultiMedia Card (MMC), PCIExpress (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), and Non-Volatile Memory Express (NVMe).

The storage device 120 is accessed by the host device 110. The storage device 120 may include a storage controller 121, a plurality of non-volatile memories (NVM) 123a, 123b, . . . , 123h, and a buffer memory 122. The storage device 120 may store data or process data in response to an instruction from the host device 110. For example, the storage device 120 may be a Solid state Drive (SSD), a smart SSD, an embedded Multimedia Card (eMMC), an embedded Universal Flash Storage (UFS) memory device, a UFS memory card, Compact Flash (CF), Secure Digital (SD), Micro Secure Digital (Micro-SD), Mini Secure Digital (Mini-SD), extreme Digital (xD) or memory stick.

The storage controller 121 may control the operation of the storage device 120. For example, the storage controller 121 may control operations of the plurality of non-volatile memories 123a, 123b, . . . , 123h based on a command, an address, and data received from the host device 110.

The plurality of non-volatile memories 123a, 123b, . . . , 123h may store data. For example, the plurality of non-volatile memories 123a, 123b, . . . , 123h may store metadata and other user data.

Each of the plurality of non-volatile memories 123a, 123b, . . . , 123h may include a memory cell array including non-volatile memory cells capable of maintaining stored data even when power of the storage system 100 is cut off, and the memory cell array may be divided into a plurality of memory blocks. The plurality of memory blocks may have a two-dimensional horizontal structure in which memory cells are two-dimensionally arranged on the same plane (or layer) or a three-dimensional (3D) vertical structure in which non-volatile memory cells are three-dimensionally arranged. The memory cell may be a Single Level Cell (SLC) storing one bit of data or a Multi-Level Cell (MLC) storing two or more bits of data. However, the present invention is not necessarily limited thereto, and each memory cell may also be a Triple Level Cell (TLC) storing 3 bit data or a Quadruple Level Cell storing 4 bit data.

Each of the plurality of non-volatile memories 123a, 123b, . . . , 123h may include a plurality of dies or a plurality of chips each including a memory cell array. For example, each non-volatile memory 123a, 123b, . . . , 123h may include a plurality of chips, and each of the plurality of chips may include a plurality of dies. In the exemplary embodiment, the plurality of non-volatile memories 123a, 123b, . . . , 123h may also include a plurality of channels each including a plurality of chips.

In an exemplary embodiment, a plurality of namespaces may be set for the plurality of non-volatile memories 123a, 123b, . . . , 123h. Each of the plurality of namespaces may be allocated to a plurality of tenants. For example, as will be described below with reference to FIGS. 3 to 5, one namespace may be set for at least some of the plurality of non-volatile memories 123a, 123b, . . . , 123h. In addition, at least one of the plurality of namespaces may be a public namespace that may be allocated to all of the plurality of tenants. Each of the plurality of namespaces may have a size that can be expressed by the number of at least one logical block, and one logical block may include at least one memory block.

Each of the plurality of non-volatile memories 123a, 123b, . . . , 123h may include a NAND flash memory. In an exemplary embodiment, each of the plurality of non-volatile memories 123a, 123b, . . . , 123h may include Electrically Erasable Programmable Read-Only Memory (EEPROM), Phase Change Random Access Memory (PRAM), resistive RAM (ReRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM) or a memory similar thereto. Hereinafter, in the present disclosure, it is assumed that each of the plurality of non-volatile memories 123a, 123b, . . . , 123h is a NAND flash memory device.

The buffer memory 122 may store instructions and data executed and processed by the storage controller 121. The buffer memory 122 may temporarily store data stored in or to be stored in the plurality of non-volatile memories 123a, 123b, . . . , 123h.

In the exemplary embodiment, at least one memory area may be set for the buffer memory 122. Each of at least one memory area may be allocated to a plurality of tenants.

The buffer memory 122 may be implemented as a volatile memory, such as dynamic random access memory (DRAM), static RAM (SRAM), or the like. However, the present disclosure is not necessarily limited thereto, and the buffer memory 122 may be implemented as a non-volatile memory of various types, such as non-volatile memory of a resistive type including magnetic RAM (MRAM), phase change RAM (PRAM), or resistive RAM (ReRAM), flash memory, Nano Floating Gate Memory (NFGM), Polymer Random Access Memory (PoRAM), or Ferroelectric Random Access Memory (FRAM). In the present exemplary embodiment, the buffer memory 122 is illustrated as being provided from beyond the storage controller 121, but is not necessarily limited thereto, and the buffer memory 122 may be provided within the storage controller 121.

The storage controller 121 may check a data structure of each of the plurality of namespaces. The data structure may include the size of the namespace (NSZE: Namespace Size) (hereinafter, described as "size"), the number of allocable logical blocks of the namespace (NCAP: Namespace Capacity)(hereinafter, described as "capacity"), and the number of currently allocated logical blocks of the namespace (NUSE: Namespace Utilization)(hereinafter, referred to as "usage rate"). The storage controller 121 may output information about the data structure of the namespace to the host device 110. In the exemplary embodiment, the tenant manager 113 may issue a command identifying the data structure of the namespace. Then, the storage controller 121 may output information about the data structure of each of the identified plurality of namespaces to the tenant manager 113.

The storage controller 121 may dynamically adjust resources for a task requested by a user. In the exemplary embodiment, the storage controller 121 may dynamically adjust resources of each of the plurality of namespaces by using information about the resources of each of the plurality of namespaces. The storage controller 121 may adjust the sizes of the plurality of namespaces by using the size of each of the plurality of namespaces, the capacity of each of the plurality of namespaces, and the usage rate of each of the plurality of namespaces. The size of one namespace may be expressed as the sum of the number of logical blocks allocable to the namespace and the number of logical blocks currently allocated to the namespace. Alternatively, the size of one namespace may be expressed as the sum of the capacities of logical blocks allocable to the namespace and the capacities of the logical blocks currently allocated to the namespace.

If the capacity of any one namespace (for example, the first namespace) is less than a first threshold, the storage controller 121 may decrease the size of another namespace (for example, the second namespace) and increase the size of the first namespace so that logical blocks allocable to another namespace are allocated (or rented) to the first namespace. Here, the first threshold may be set to a predetermined ratio of the size of the first namespace.

When the capacity of the first namespace in which the size of the namespace is increased is greater than or equal to the second threshold, the storage controller 121 may decrease the size of the first namespace and increase the size of the second namespace by the decreased size of the first namespace. Here, the second threshold may be set to a predetermined ratio of the size of the first namespace. In this case, garbage collection may be performed on a portion of the memory blocks included in the first namespace, and a logical block corresponding to the memory block on which the garbage collection has been performed may be set as a logical block allocable to the second namespace.

In the above description, it has been described that resources of each of a plurality of namespaces are dynamically adjusted by using the capacity of the namespace, but the usage rate of the namespace may also be used instead of the capacity of the namespace.

The storage controller 121 may monitor QoS of a service provided to each of the virtual machines (or tenants), and may adjust the size of the memory area of the buffer memory 122 according to the QoS. QoS is a concept to describe or measure the overall performance of a service, such as a computer network, in particular, the performance in terms of users, and may be quantitatively measured in consideration of various aspects, such as bit rate, throughput, transmission delay, availability, and jitter. For example, the storage controller 121 may measure the memory latency of each of the tenants as QoS of a service provided to each of the tenants.

The storage controller 121 may adjust the size of the memory area of the buffer memory 122 to ensure the lowest QoS for each tenant.

When the QoS of the service provided to one tenant (for example, the first tenant) is less than a third threshold, the storage controller 121 may decrease the size of the memory area allocable to another tenant (for example, the second tenant) or the memory area shareable by the tenants, and increase the size of the memory area allocable to the first tenant so as to allocate a portion of a memory area that may be allocated to another tenant to the first tenant. Here, the third threshold may be set to a QoS value having a predetermined ratio of the minimum QoS of the service provided to the first tenant.

When the QoS of the service provided to the first tenant is greater than or equal to a fourth threshold, the storage controller 121 may decrease the size of the memory area allocable to the first tenant and increase the size of the memory area allocable to the second tenant by the decreased size of the memory area. Here, the fourth threshold may be set to a QoS value having a predetermined ratio of the minimum QoS of the service provided to the first tenant.

In the above, the storage controller 121 may dynamically adjust the size of each of the plurality of namespaces set for the plurality of non-volatile memories 123a, 123b, . . . , 123h in the storage device 120, or adjust the size of the memory area of the buffer memory 122. Even when the storage controller 121 receives the command for identifying the data structure of the namespace issued by the tenant manager 113 and outputs the data structure of the namespace to the tenant manager 113, the storage controller 121 might not transmit Information on the size, the capacity, and the usage rate of the adjusted namespace and/or the size of the memory area. When the storage controller 121 receives the command to identify the data structure of the namespace issued by the tenant manager 113, the storage controller 121 may correct the adjusted size, capacity, and usage rate of the namespace based on the size of the namespace before the adjustment, and transmit the information about the corrected size, capacity, and usage rate of the namespace. For example, when the size of the namespace before adjustment is "a," and the adjusted size, capacity, and usage rate of the namespace are respectively "b," "c," and "d," the storage controller 121 may transmit information on each of the size, the capacity, and the usage rate of the namespace with a, c*a/b, and d*a/b.

In the exemplary embodiment, each of the storage devices 120 may be a Solid State Drive (SSD). In an exemplary embodiment, each of the storage devices 120 may be a Universal Flash Storage (UFS), a Multi Media Card (MMC), or an embedded MMC (eMMC). In an exemplary embodiment, each of the storage devices 120 may be implemented in a Secure Digital (SD) card, a micro SD card, a memory stick, a chip card, a Universal Serial Bus (USB) card, a smart card, a Compact Flash (CF) card, or the form similar thereto.

In the exemplary embodiment, each of the storage devices 120 is connected with the host device 110 through a block accessible interface including a bus, such as a Serial Advanced Technology Attachment (SATA) bus, a Small Computer Small Interface (SCSI) bus, a Non-Volatile Memory Express (NVMe) bus, a Serial Attached SCSI (SAS) bus, a UFS, and eMMC, and may be accessed in units of blocks through the block accessible interface by the host device 110.

In the exemplary embodiment, the storage device 120 may be an arbitrary computing system, such as a Personal Computer (PC), a server computer, a data center, a workstation, a digital television, and a set-top box, etc. In an exemplary embodiment, the storage device 120 is an arbitrary mobile system, such as a mobile phone, a smart phone, a tablet PC (tablet), a notebook (laptop) computer, a Personal Digital Assistant (PDA), a Portable Multimedia Player (PMP), a digital camera, a camcorder, a portable game console, a music player, a video player, a navigation device, a wearable device, an Internet of Things (IoT) device, an e-book, a Virtual Reality (VR) device, an Augmented Reality (AR) device, and a drone.

FIG. 2 is a block diagram illustrating an example of a non-volatile memory included in the storage device according to the exemplary embodiment Referring to FIG. 2, the non-volatile memory 200 includes a memory cell array 210, an address decoder 220, a page buffer circuit 230, a data input/output circuit 240, a voltage generator 250, and a control circuit 260. For example, the non-volatile memory 200 may be one of the non-volatile memories 123a, 123b, . . . , 123h of FIG. 1.

The memory cell array 210 is connected to the address decoder 220 through a plurality of string selection lines SSL, a plurality of word lines WL, and a plurality of ground selection lines GSL. Also, the memory cell array 210 is connected to the page buffer circuit 230 through a plurality of bit lines BL. The memory cell array 210 may include a plurality of memory cells connected to the plurality of word lines WL and the plurality of bit lines BL. The memory cell array 210 may be divided into a plurality of memory blocks BLK1, BLK2, . . . , BLKz each including memory cells. Also, each of the plurality of memory blocks BLK1 to BLKz may be divided into a plurality of pages.

According to the exemplary embodiment, the memory cell array 210 may be formed in a two-dimensional array structure or a three-dimensional vertical array structure.

The control circuit 260 receives a command CMD and an address ADDR from an external source (for example, the host device 110 and/or the storage controller 121 of FIG. 1) and controls an erase loop, a program loop, and a read operation of the non-volatile memory 200 based on the command CMD and the address ADDR. Here, the program loop may include a program operation and a program verification operation, and the erase loop may include an erase operation and an erase verification operation. Here, the read operation may include a normal read operation and a data recovery read operation.

For example, the control circuit 260 may generate control signals CON for controlling the voltage generator 250 and control signals PBC for controlling the page buffer circuit 230 based on the command CMD, and generate a row address R_ADDR and a column address C_ADDR may be generated based on the address ADDR. The control circuit 260 may provide the row address R_ADDR to the address decoder 220 and provide the column address C_ADDR to the data input/output circuit 240.

The address decoder 220 is connected to the memory cell array 210 through the plurality of string selection lines SSL, the plurality of word lines WL, and the plurality of ground selection lines GSL.

For example, during an erase/program/read operation, the address decoder 220 may determine at least one of the plurality of word lines WL as a selected word line in response to the row address R_ADDR, and determine the remaining word lines other than the selected word line, among the plurality of word lines WL, as non-selected word lines.

Also, during an erase/program/read operation, the address decoder 220 may determine at least one of the plurality of string selection lines SSL as a selected string selection line in response to the row address R_ADDR, and determine the remaining string selection lines as non-selected string selection lines.

In addition, during an erase/program/read operation, the address decoder 220 may determine at least one of the plurality of ground selection lines GSL as a selected ground selection line in response to the row address RA_ADDR, and determine the remaining ground selection lines as non-selected ground selection lines.

The voltage generator 250 may generate voltages VS necessary for the operation of the non-volatile memory 200 based on the power supply voltage PWR and the control signals CON. The voltages VS may be applied to the plurality of string selection lines SSL, the plurality of word lines WL, and the plurality of ground selection lines GSL through the address decoder 220. Also, the voltage generator 250 may generate an erase voltage VERS required for an erase operation based on the power supply voltage PWR and the control signals CON. The erase voltage VERS may be applied to the memory cell array 210 directly or through the bit line BL.

For example, during an erase operation, the voltage generator 250 may apply the erase voltage VERS to the common source line and/or the bit line BL of one memory block, and apply an erase allowable voltage (for example, the ground voltage) to all word lines of one memory block or word lines corresponding to some sub-blocks through the address decoder 220. During the erase verification operation, the voltage generator 250 may apply the erase verification voltage to all word lines of one memory block or apply the erase verification voltage in units of word lines.

For example, during a program operation, the voltage generator 250 may apply a program voltage to the selected word line and may apply a program prohibition voltage to the non-selected word lines through the address decoder 220. During the program verification operation, the voltage generator 250 may apply a program verification voltage to the selected word line through the address decoder 220 and may apply a verification pass voltage to the non-selected word lines.

Also, during a normal read operation, the voltage generator 250 may apply a read voltage to the selected word line and apply a read pass voltage to the non-selected word lines through the address decoder 220. Also, during a data recovery read operation, the voltage generator 250 may apply a read voltage to a word line adjacent to the selected word line and may apply a recovery read voltage to the selected word line through the address decoder 220.

The page buffer circuit 230 may be connected to the memory cell array 210 through the plurality of bit lines BL. The page buffer circuit 230 may include a plurality of page buffers. In the exemplary embodiment, one bit line may be connected to one page buffer. In an exemplary embodiment, two or more bit lines may be connected to one page buffer.

The page buffer circuit 230 may store write data DAT to be programmed in the memory cell array 210 or store read data DAT sensed from the memory cell array 210. For example, the page buffer circuit 230 may operate as a write driver or a sense amplifier according to an operation mode of the non-volatile memory 200.

The data input and output circuit 240 may be connected to the page buffer circuit 230 through data lines DL. The data input and output circuit 240 may provide the write data DAT to the memory cell array 210 through the page buffer circuit 230 in response to the column address C_ADDR, or may provide the read data DAT output from the memory cell array 210 through the page buffer circuit 230 to an external element.

FIG. 3, FIG. 4, FIG. 5, FIG. 6, and FIG. 7 are diagrams illustrating operations of generating, setting, and managing the namespace in the storage device according to the exemplary embodiment.

Figure 3:
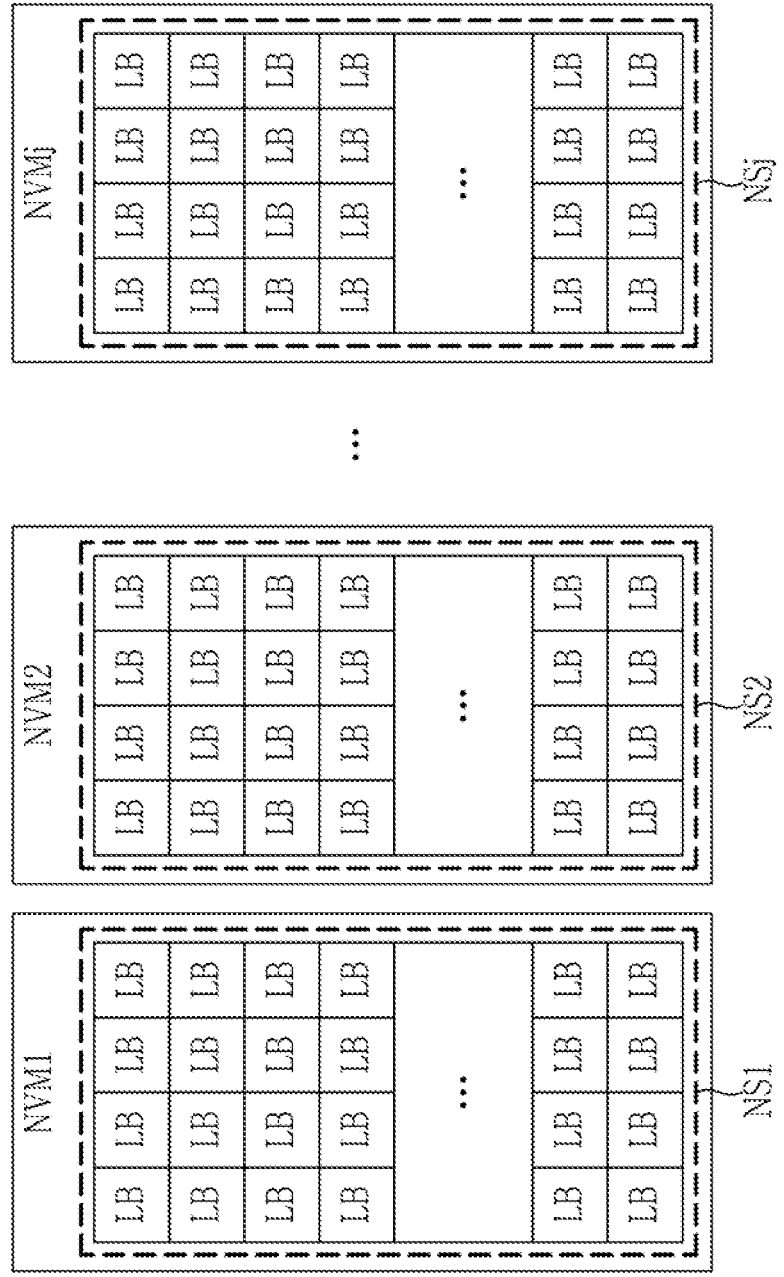
FIG. 3, FIG. 4, FIG. 5, FIG. 6, and FIG. 7 are diagrams illustrating operations of generating, setting, and managing a namespace in the storage device according to an exemplary embodiment.

FIG. 3 illustrates an example of generating and setting a plurality of namespaces NS1, NS2, . . . , NSj for a plurality of non-volatile memories NVM1, NVM2, . . . , NVMj (where j is an integer greater than or equal to 2). The plurality of non-volatile memories NVM1, NVM2, . . . , NVMj is included in the same storage device, and accordingly, the plurality of namespaces NS1, NS2, . . . , NSj may also be included in one storage device.

Each of the plurality of non-volatile memories NVM1, NVM2 . . . , NVMj may include a plurality of logical blocks LB. For example, assuming that the total capacity of one non-volatile memory NVM1 is 100 gigabytes (GB), the non-volatile memory NVM1 may be divided into a plurality of logical blocks LB each having a storage capacity of 1 GB. For example, the plurality of non-volatile memories NVM1, NVM2, . . . , NVMj included in the storage device may be divided into the plurality of logical blocks LB having a storage capacity of 1 GB.

Referring to FIG. 3, one namespace may be generated and set for one non-volatile memory. For example, the namespace NS1 may be generated and set for the entire area of the non-volatile memory NVM1, the namespace NS2 may be generated and set for the entire area of the non-volatile memory NVM2, and the namespace NSj may be generated and set for the entire area of the non-volatile memory NVMj. The plurality of namespaces NS1, NS2, . . . , NSj may each have an identifier.

The size of the plurality of namespaces NS1, NS2, . . . , NSj may be determined by the number of logical blocks LB included in each of the plurality of namespaces NS1, NS2, . . . , NSj. The sizes of the plurality of namespaces NS1, NS2, . . . , NSj may be the same as or different from each other. For example, the plurality of namespaces NS1, NS2, . . . , NSj may include the same number of logical blocks or may include different numbers of logical blocks.

For example, in FIG. 3, it is illustrated that the number of namespaces NS1, NS2, . . . , NSj is the same as the number of non-volatile memories NVM1, NVM2, . . . , NVMj, but the present invention is not necessarily limited thereto, and the number of namespaces and the number of non-volatile memories may be variously changed.

Figure 4:
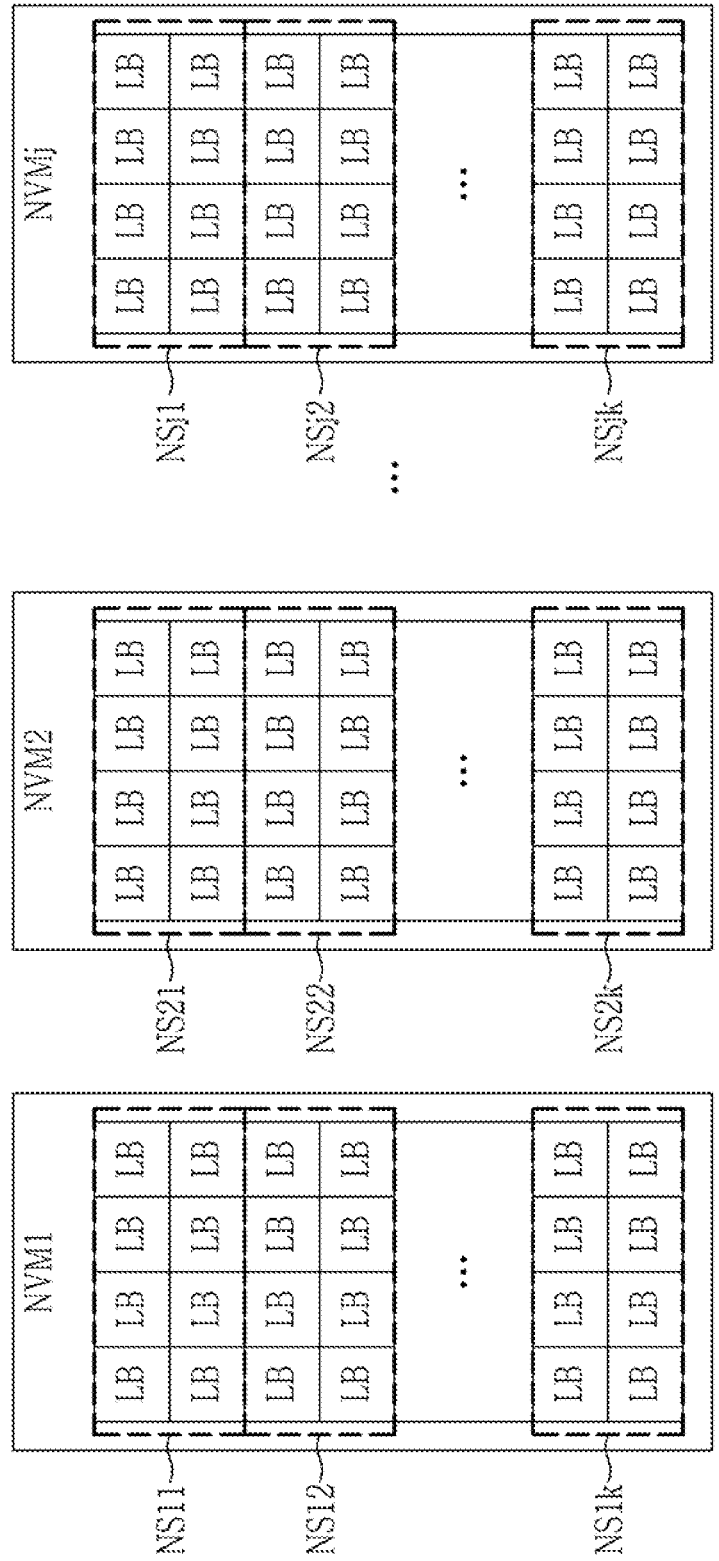

FIG. 4 illustrates an example of generating and setting the plurality of namespaces NS11, NS12, . . . , NS1k, NS21, NS22, . . . , NS2k, NSj1, NSj2, . . . , NSjk for the plurality of non-volatile memories NVM1, NVM2, . . . , NVMj (where k is an integer greater than or equal to 2).

Referring to FIG. 4, the plurality of namespaces may be generated and set for a plurality of non-volatile memories NVM1, NVM2, . . . , NVMj. For example, the plurality of namespaces NS11, NS12, . . . , NS1k may be generated and set for the entire area of the non-volatile memory NVM1, the plurality of namespaces NS21, NS22, . . . , NS2k is generated and set for the entire area of the non-volatile memory NVM2, and the plurality of namespaces NSj1, NSj2, . . . , NSjk may be generated and set for the entire area of the non-volatile memory NVMj. The plurality of namespaces NS11, NS12, . . . , NS1k, NS21, NS22, . . . , NS2k, NSj1, NSj2, . . . , NSjk may have the same size or different sizes.

Figure 5:
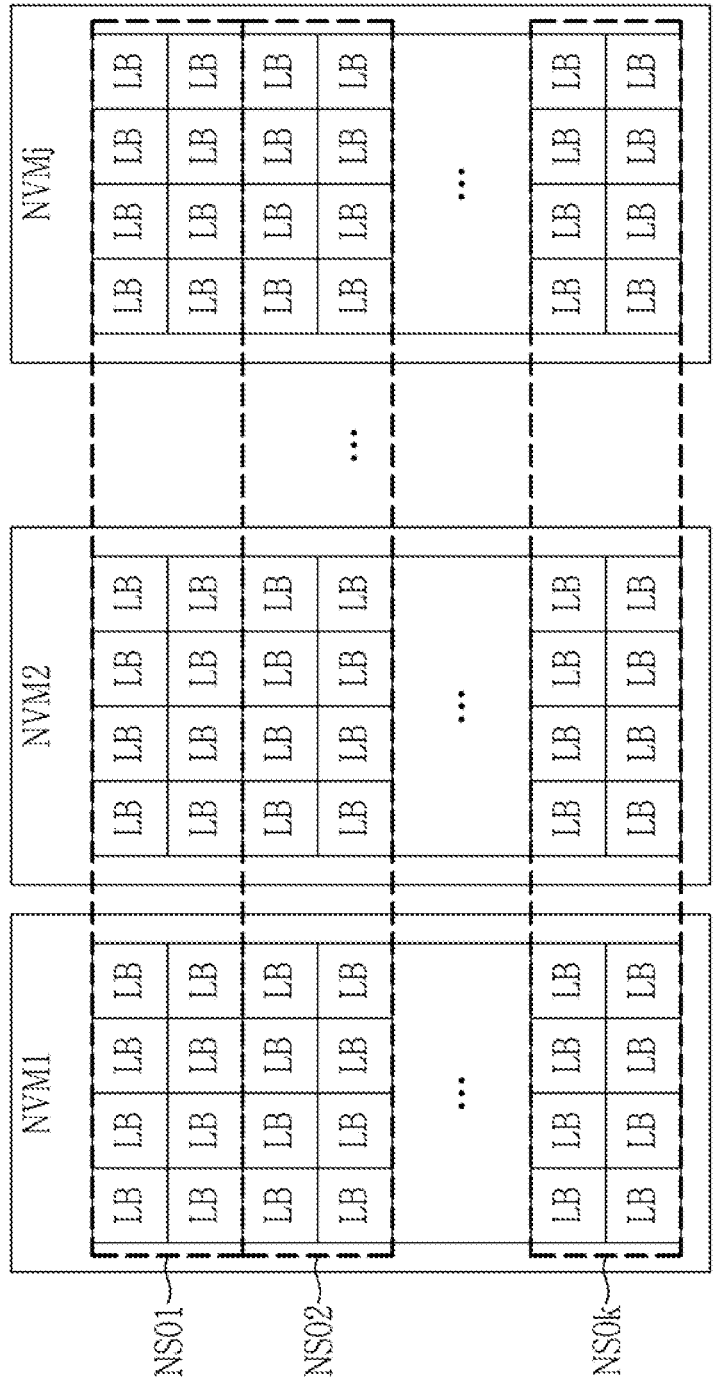

FIG. 5 illustrates an example of generating and setting a plurality of namespaces NS01, NS02, . . . , NS0k for a plurality of non-volatile memories NVM1, NVM2, . . . , NVMj.

Referring to FIG. 5, one namespace may be generated and set for all of the plurality of non-volatile memories NVM1, NVM2, . . . , NVMj. For example, a namespace NS01 may be generated and set for partial areas of all of the plurality of non-volatile memories NVM1, NVM2, . . . , NVMj, a namespace NS02 may be generated and set for other partial areas of all of the plurality of non-volatile memories NVM1, NVM2, . . . , NVMj, and a namespace NS0k may be generated and set for still other partial areas of all of the plurality of non-volatile memories NVM1, NVM2, . . . , NVMj.

Figure 6:
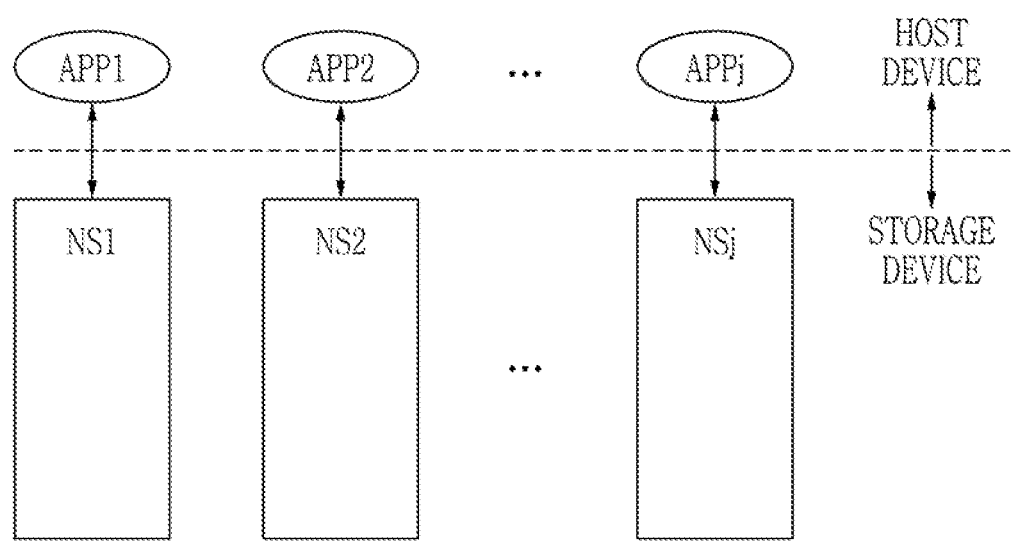

FIG. 6 illustrates an example in which a plurality of namespaces NS1, NS2, . . . , NSj is allocated. Here, it is assumed that the plurality of namespaces NS1, NS2, . . . , NSj is included in the same single storage device.

According to the types and characteristics of the plurality of applications APP1, APP2, . . . , APPj running on the host device 110 (see FIG. 1), the plurality of applications APP1, APP2, . . . , APPj may be allocated to the plurality of namespaces NS1, NS2, . . . , NSj, respectively. For example, the namespace NS1 may be allocated to the application APP1, the namespace NS2 may be allocated to the application APP2, and the namespace NSj may be allocated to the application APPj.

In the exemplary embodiment, each of the plurality of applications APP1, APP2, . . . APPj is also referred to as an application program, and may be software executed on an operating system. For example, each of the plurality of applications APP1, APP2, . . . , APPj may be programmed to support the operations of generating, copying, and deleting a file. For example, each of the plurality of applications APP1, APP2, . . . , APPj may provide an Internet browser, a game, a video, a camera, and the like. Each of the plurality of applications APP1, APP2, . . . , APPj may generate an operation, a request, and the like for using or accessing (for example, for writing/reading/erasing data, and the like) one of the plurality of namespaces NS1, NS2, . . . , NSj.

According to the exemplary embodiment, only one namespace may be accessed by one application, or two or more namespaces may be simultaneously accessed by two or more applications.

Figure 7:
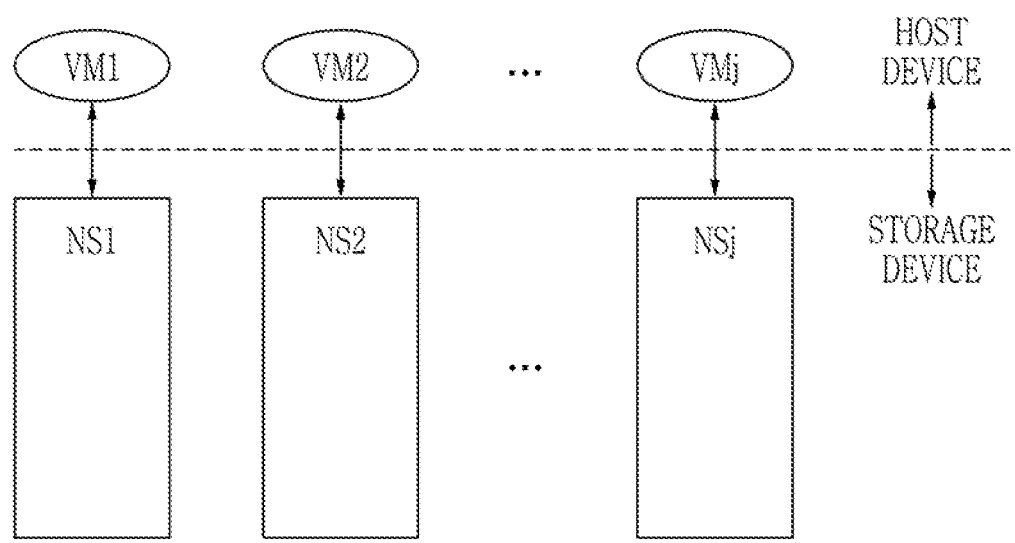

FIG. 7 illustrates an example in which the plurality of namespaces NS1, NS2, . . . , NSj is allocated. Hereinafter, to the extent that an element is not described in detail, it may be assumed that the element is at least similar to a corresponding element that has been described elsewhere within the present disclosure.

For example, the host device 110 (see FIG. 1) may allocate each of the plurality of virtual machines VM1, VM2, . . . , VMj to each of the plurality of namespaces NS1, NS2, . . . , NSj. For example, the namespace NS1 may be allocated to the virtual machine VM1, the namespace NS2 may be allocated to the virtual machine VM2, and the namespace NSj may be allocated to the virtual machine VMj.

In the exemplary embodiment, the host device 110 (see FIG. 1) may support a virtualization function. The plurality of virtual machines VM1, VM2, . . . , VMj may each be a virtualization core or processor generated by a virtualization operation, and may each independently drive an operating system and an application. For example, a virtualization function and a virtualization operation may be performed by using VMware, Single-Root IO Virtualization (SR-IOV), or the like. For example, an operating system driven by one virtual machine may be referred to as a guest O/S. Each of the plurality of virtual machines VM1, VM2, . . . , VMj may generate an operation, a request, and the like for using or accessing (for example, for writing/reading/erasing data, and the like) one of the plurality of namespaces NS1, NS2, . . . , NSj.

Figure 8:
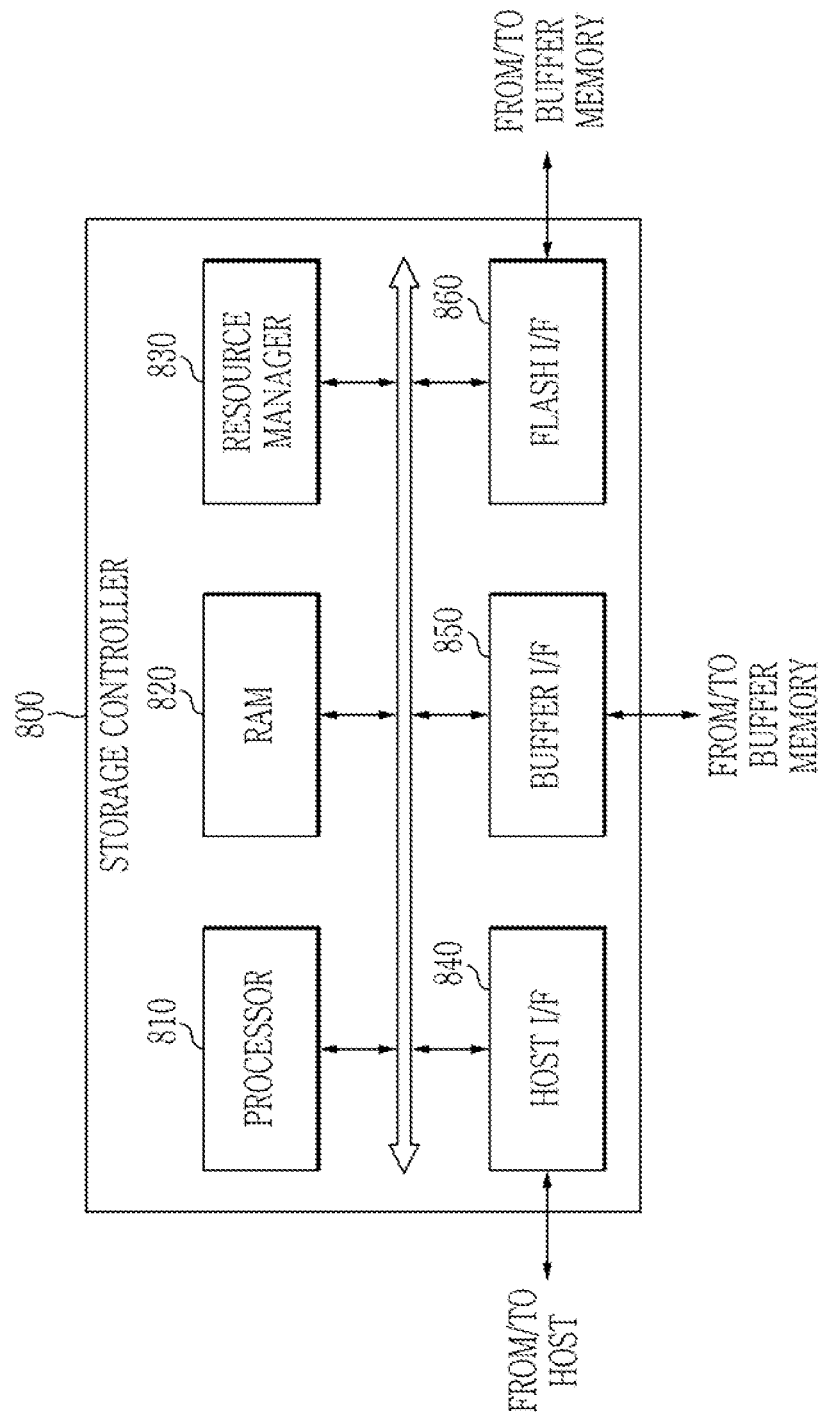
FIG. 8 is a block diagram illustrating an example of a storage controller included in the storage device according to an exemplary embodiment.

FIG. 8 is a block diagram illustrating an example of a storage controller included in the storage device according to the exemplary embodiment.

Referring to FIG. 8, the storage controller 800 may include at least one processor 810, a memory 820, a resource manager 830, a host interface 840, a buffer interface 850, and a flash interface 860.

The processor 810 may control the operation of the storage controller 800 in response to a command received from the host device 110 (see FIG. 1) through the host interface 840. For example, the processor 810 may control each configuration by utilizing firmware for driving the storage device.

The memory (RAM) 820 may store instructions and data executed and processed by the processor 810. For example, the memory 820 may also be implemented as a volatile memory, such as DRAM or static RAM (SRAM), or a non-volatile memory, such as PRAM or flash memory. The memory 820 may store firmware and data for controlling the storage controller 800. The stored firmware and data may be driven or processed by the processor 810. The software hierarchical structure of the storage controller 800 implemented as firmware may include an interface layer, a Flash Translation Layer (FTL), and the like.

The resource manager 830 may dynamically manage resources of a storage device including the storage controller 800. The resource manager 830 may adjust the size of the namespace, adjust the size of the memory area of the buffer memory 122 in FIG. 1 and the like based on the usage rate of each namespace. QoS of the service provided to each tenant, and the like.

The resource manager 830 may be implemented in software (or firmware) or hardware. Alternatively, the resource manager 830 may be implemented as a combination of software and hardware. When the resource manager 830 is implemented as software, instructions of a program constituting the resource manager 830 may be loaded into the memory 820 and executed by the processor 810.

The host interface (I/F) 840 may provide a physical connection between the host device and the storage device. For example, the host interface 840 may provide interfacing with the storage device in response to a bus format of the host device. In the exemplary embodiment, at least one of various interface methods, such as USB, MMC, PCI-E, ATA, SATA, PATA, SCSI, SAS, ESDI, IDE, and NVMe, may be applied to the host interface 840.

The buffer interface (I/F) circuit 850 provides an interface between the storage controller 800 and the buffer memory. Data to be stored in the non-volatile memory or data read from the non-volatile memory may be temporarily stored in the buffer memory through the buffer interface circuit 850.

Flash interface (I/F) 860 may communicate with non-volatile memories. The flash interface 860 may transmit data to the non-volatile memories and receive data read from the non-volatile memories. In one exemplary embodiment, the flash interface 860 may be connected to non-volatile memories through one channel. In an exemplary embodiment, the flash interface 860 may be connected to non-volatile memories through a plurality of channels.

The storage controller 800 may further include coded modulation, such as a Bose-Chaudhuri-Hocquenghem (BCH) code, a Low Density Parity Check (LDPC) code, a Turbo Code, a Reed-Solomon code, and a Convolution Code, a Recursive Systematic Code (RSC), Trellis-Coded Modulation (TCM), Block Coded Modulation (BCM), or Error Checking and Correcting (ECC) performing ECC encoding and ECC decoding by using other error correction codes.

Next, an operating method of the storage device will be described with reference to FIGS. 9 to 13.

Figure 9:
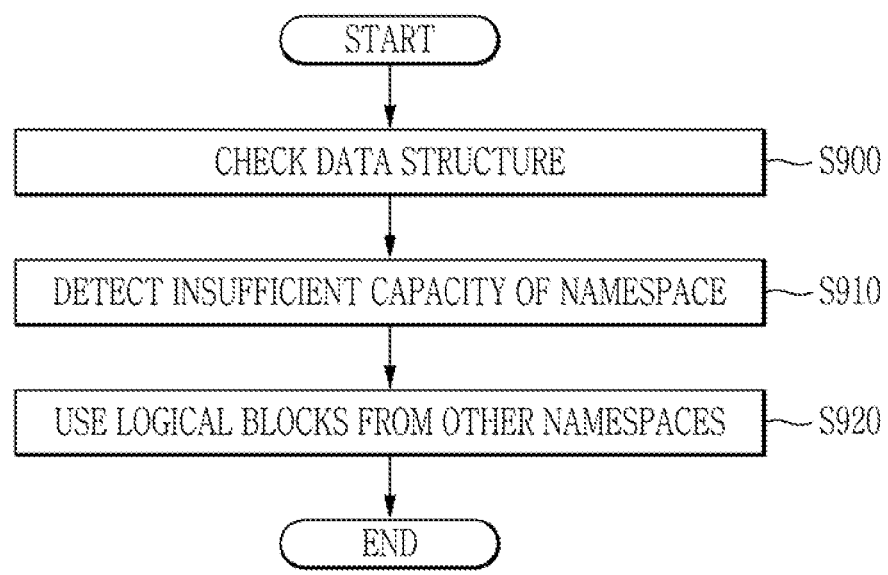
FIG. 9 is a flowchart illustrating a method of operating a storage device according to an exemplary embodiment.

FIG. 9 is a flowchart illustrating a method of operating a storage device according to an exemplary embodiment, and FIG. 10, FIG. 11, FIG. 12, and FIG. 13 are diagrams illustrating a method of operating the storage device according to the exemplary embodiment.

Referring to FIG. 9, the resource manager 830 checks the data structure of the namespace S900. The resource manager 830 may receive information on the non-volatile memory through the flash interface 860 to check the data structure of the namespace. The resource manager 830 may receive information about the namespace data structure including the size, capacity, and usage rate of the namespace from the non-volatile memory. The resource manager 830 may receive information about the namespace data structure including the size, capacity, and usage rate of the namespace corresponding to the identifier of the namespace.

Figure 10:
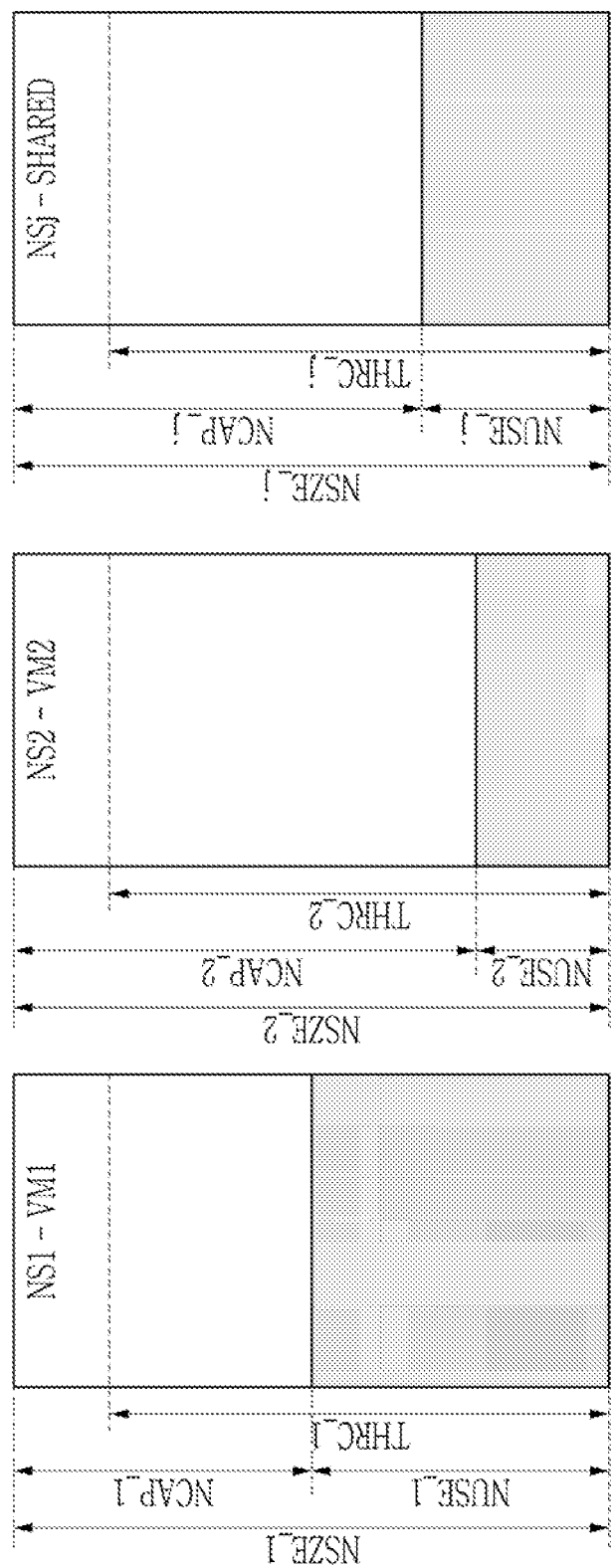
FIG. 10, FIG. 11, FIG. 12, and FIG. 13 are diagrams illustrating a method of operating the storage device according to an exemplary embodiment.

Referring to FIG. 10, some NS1 and NS2 of the plurality of namespaces NS1, NS2, and NSj may be allocated to the virtual machines VM1 and VM2, and another namespace NSj may be shared by the virtual machines (SHARED).

The resource manager 830 may identify the data structure including sizes $NSZE\_1$, $NSZE\_2$, $NSZEj$, capacities $NCAP\_1$, $NCAP\_2$, $NCAP\_j$, and usage rates $NUSE\_1$, $NUSE\_2$, $NUSE\_j$ of the plurality of namespaces NS1, NS2, NSj, respectively.

When the resource manager 830 receives an identification command for identifying the data structure of the namespace from the host device, the resource manager 830 may also output information on the data structure of the namespace checked in operation S900 to the host device. Also, when the identification command includes the identifier of the namespace, the resource manager 830 may output information about the data structure of the namespace corresponding to the identifier of the namespace to the host device.

Next, the resource manager 830 detects a namespace having insufficient capacity (S910). The resource manager 830 may detect a namespace having insufficient capacity, among the plurality of namespaces, by using the size, capacity, and usage rate of each of the namespaces. In some exemplary embodiments, the resource manager 830 may detect a namespace in which the usage rate of the predetermined namespace is greater than or equal to a predetermined rate (for example, 90%) of the size of the corresponding namespace as a namespace with insufficient capacity.

Figure 11:
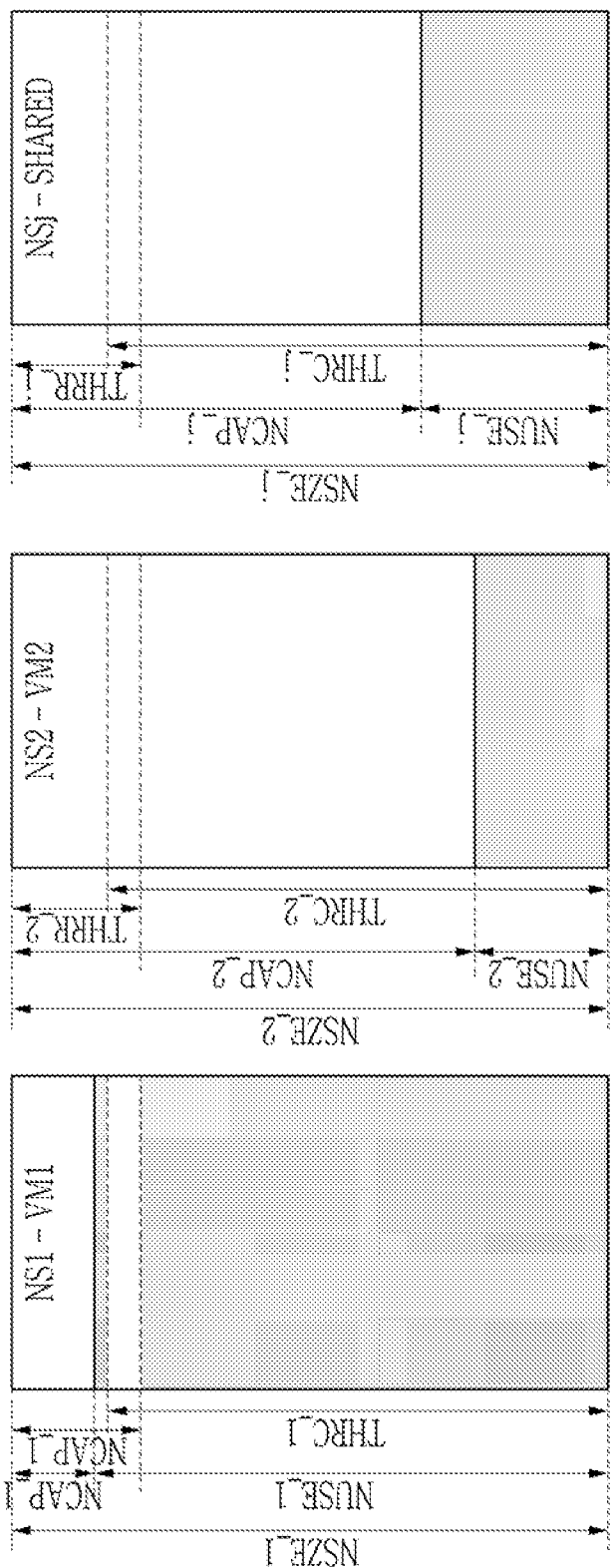

Referring to FIG. 11, the resource manager 830 may set first threshold $THRC\_1$, $THRC\_2$, and $THRC\_j$ of the plurality of namespaces NS1, NS2, and NSj. The first thresholds $THRC\_1$, $THRC\_2$, and $THRC\_j$ may be set to predetermined ratios of the sizes $NSZE\_1$, $NSZE\_2$, and $NSZE\_j$ of the plurality of namespaces NS1, NS2, and NSj. For example, the first threshold $THRC\_1$ of the namespace NS1 may be a capacity of 90% of the size $NSZE\_1$ or the number of logical blocks of the namespace NS1. The resource manager 830 may detect the namespace NS1 in which the usage rate $NUSE\_1$ is greater than or equal to the first threshold $THRC\_1$, among the plurality of namespaces NS1, NS2, and NSj. The resource manager 830 may detect the namespace NS1 having the insufficient capacity NCAP1, among the plurality of namespaces NS1, NS2, and NSj. For example, the resource manager 830 may detect a namespace in which the capacity of the predetermined namespace is less than a predetermined ratio (for example, 10%) of the corresponding size.

Next, the resource manager 830 controls a namespace having insufficient capacity to use a logical block of another namespace (S920). The resource manager 830 may control some of logical blocks of a namespace having sufficient capacity, among the plurality of namespaces, to be allocable to the namespace having insufficient capacity. The resource manager 830 may detect a namespace having a sufficient capacity, among the plurality of namespaces, using the size, capacity, and usage rate of each of the namespaces. In some exemplary embodiments, the resource manager 830 may detect a namespace in which the capacity of the predetermined namespace is greater than or equal to a predetermined ratio (for example, 20%) of the size of the corresponding namespace.

Referring back to FIG. 11, the resource manager 830 may set second thresholds $THRR\_1$, $THRR\_2$, and $THRR\_j$ of the plurality of namespaces NS1, NS2, and NSj. The second thresholds $THRR\_1$, $THRR\_2$, and $THRR\_j$ may be set to predetermined ratios of the sizes $NSZE \ldots 1$, $NSZE\_2$, and $NSZE\_j$ of the plurality of namespaces NS1, NS2, and NSj. For example, the second threshold $THRR\_1$ of the namespace NS1 may be a capacity of 20% of the size $NSZE\_1$ or the number of logical blocks of the namespace NS1. The resource manager 830 may detect namespaces NS2 and NSj in which the capacities are greater than or equal to the second thresholds $THRR\_2$ and $THRR\_j$, among the plurality of namespaces NS1, NS2, and NSj. The resource manager 830 may detect the namespaces NS2 and NSj having sufficient capacities $NCAP\_2$ and $NCAP\_j$, among the plurality of namespaces NS1, NS2, and NSj. For example, the resource manager 830 may detect a namespace in which the capacity of the predetermined namespace is greater than or equal to a predetermined ratio (for example, 20%) of the corresponding size.

The resource manager 830 may control the namespace NS1 having the insufficient capacity NCAP1 to use the allocable logical block of at least one namespace among the namespaces NS2 and NSj having the sufficient capacity NCAP_2 and NCAP_j.

Figure 12:
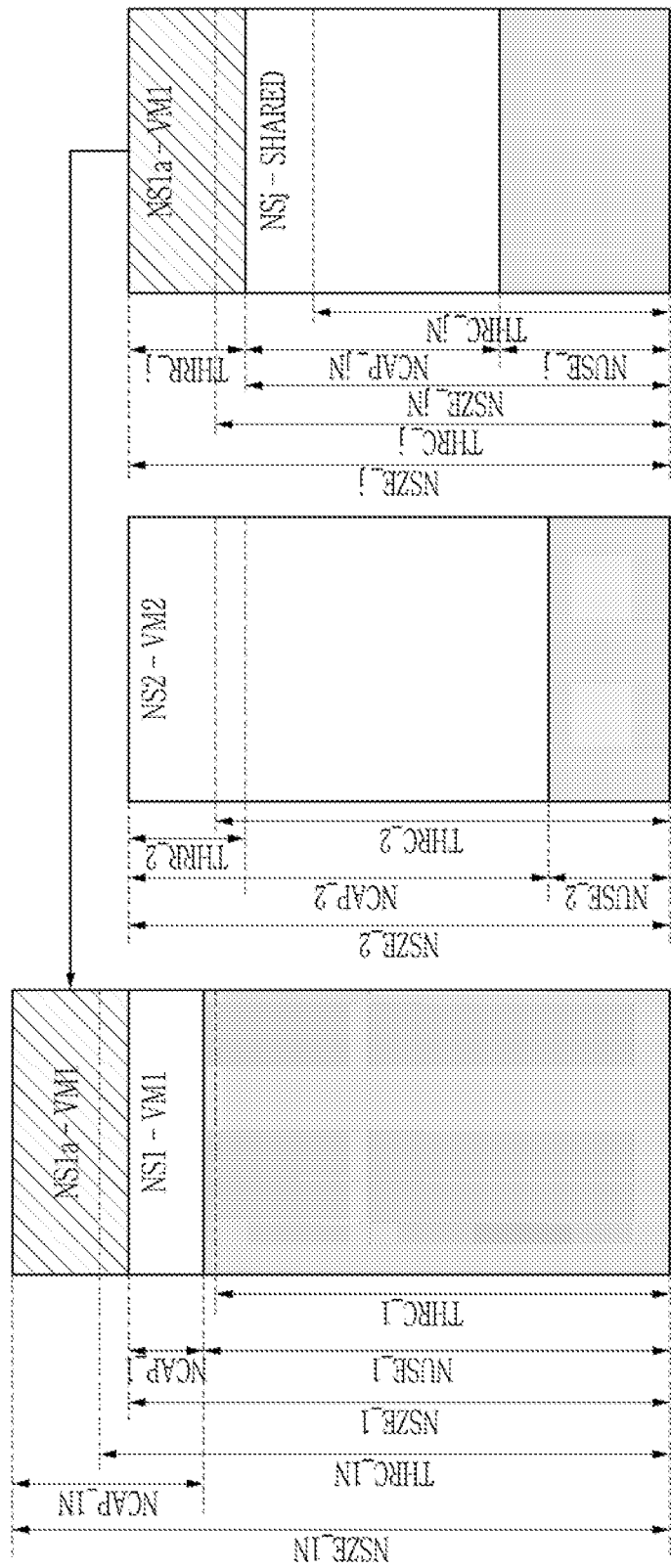

Referring to FIG. 12, the resource manager 830 may control a part NSIa of the logical blocks NCAP_j that can be allocated to the namespace NSj shared by the virtual machines to be allocable to the namespace NS1. In some exemplary embodiments, when the capacity of the logical block NSIa is added to the namespace NS1, the resource manager 830 may determine the capacity of the logical block NSla so that the capacity of the namespace NS1 is out of the insufficient state.

Since the allocable logical block NS1$a$ is further included in the namespace NS1, the size of the namespace NS1 may be increased from NSZE_1 to NSZE_1N, and the capacity of the namespace NS1 may also be increased from NCAP_1 to NCAP_1N. The first threshold of the namespace NS1 may also be changed from THRC_1 to THRC_1N and set. Then, since the usage rate of the namespace NS1 is less than the first threshold THRC_1N, the capacity of the namespace NS1 is not insufficient.

The size of the namespace NSj may be decreased from NSZE_j to NSZE_jN, and the capacity of the namespace NSj may also be decreased from NCAP_j to NCAP_jN. The first threshold of the namespace NSj may also be changed from THRC_j to THRC_jN and set. In an exemplary embodiment, the resource manager 830 may determine the capacity of the part NS1$a$ of the logical block allocable to the namespace NS1 so that the usage rate of the namespace NSj maintains below the changed first threshold THRCjN. Then, even after the part NS2$a$ of the logical block NS1$a$ is controlled to be allocable to the namespace NS1, the capacity of the namespace NSj may be maintained in a sufficient state.

In the above, it has been described that the capacity of the logical block NS1$a$ is added to the namespace NS1, thereby escaping from the state in which the capacity of the namespace NS1 is insufficient, but when the capacity of the namespace NS1 fails to escape the insufficient state by the logical block NS1$a$ added from the namespace NSj, the resource manager 830 may control the namespace NS1 to use an allocable logical block of another namespace NS2.

In one exemplary embodiment, the resource manager 830 may first determine whether the namespace NSj shared by the virtual machines has the sufficient capacity, and then determine whether the namespace NS2 used exclusively by the other virtual machines has the sufficient capacity.

Figure 13:
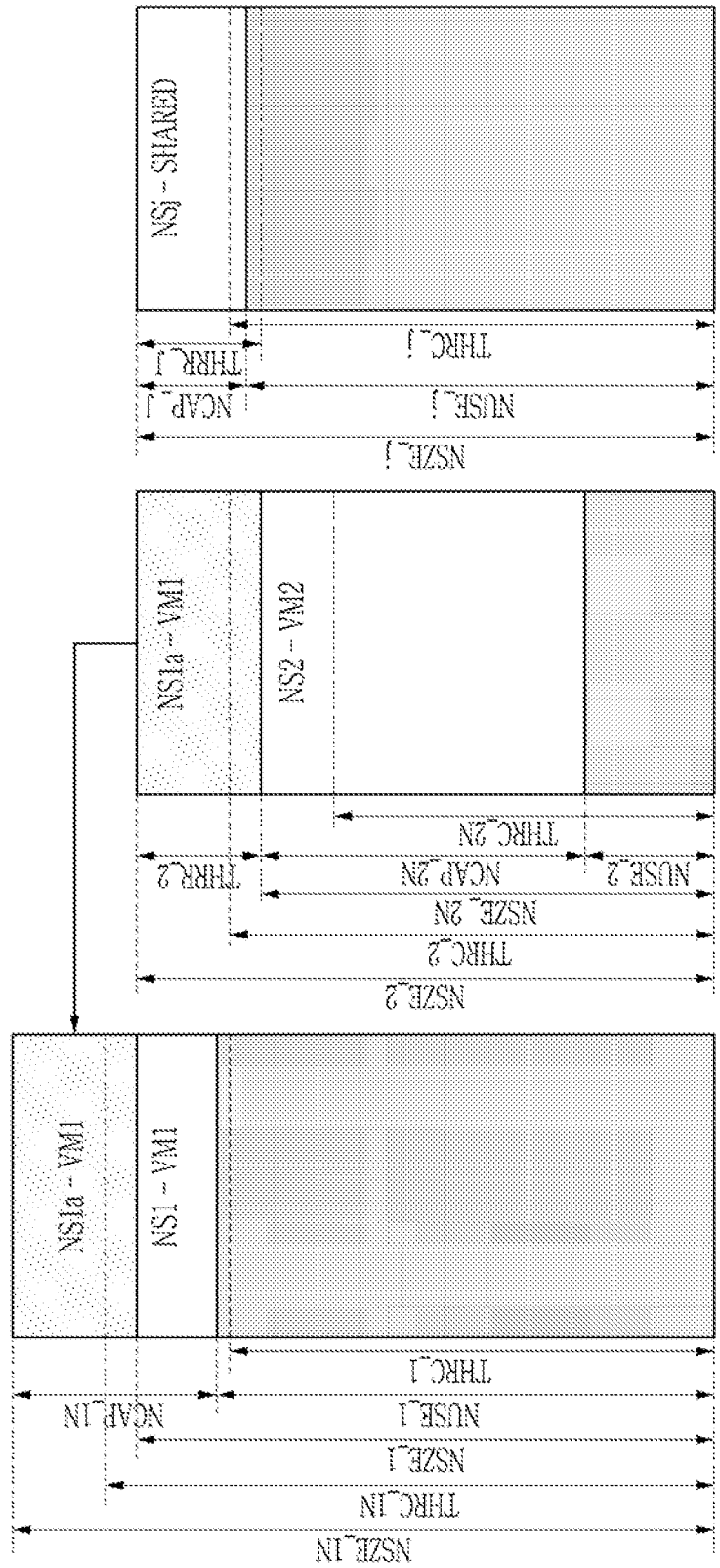

Referring to FIG. 13, when the capacity NCAP_j of the namespace NSj shared by the virtual machines is less than the second threshold THRR_j, the resource manager 830 may control a part NS1$a$ in the logical block NCAP_2 allocable to the namespace NS2 used by other virtual machines to be allocable to the namespace NS1. Since the allocable logical block NS1$a$ is further included in the namespace NS1, the size of the namespace NS1 may be increased from NSZE_1 to NSZE_1N, and the capacity of the namespace NS1 may also be increased from NCAP_1 to NCAP_1N. The first threshold of the namespace NS1 may also be changed from THRC_1 to THRC_1N and set. Then, since the usage rate of the namespace NS1 is less than the first threshold THRC_1N, the capacity of the namespace NS1 is not insufficient. The size of the namespace NS2 may be decreased from NSZE_2 to NSZE_2N, and the capacity of the namespace NS2 may also be decreased from NCAP_2 to NCAP_2N. The first threshold of the namespace NS2 may also be changed from THRC_2 to THRC_2N and set. In an exemplary embodiment, the resource manager 830 may determine the capacity of the part NSla of the logical block allocable to the namespace NS1 so that the usage rate of the namespace NS2 remains below the changed first threshold THRC_2N. Then, even after the part NS1$a$ of the logical block is controlled to be allocable to the namespace NS1, the capacity of the namespace NS2 may be maintained in the sufficient state.

Next, a method of operating the storage device will be described with reference to FIGS. 14 and 15.

Figure 14:
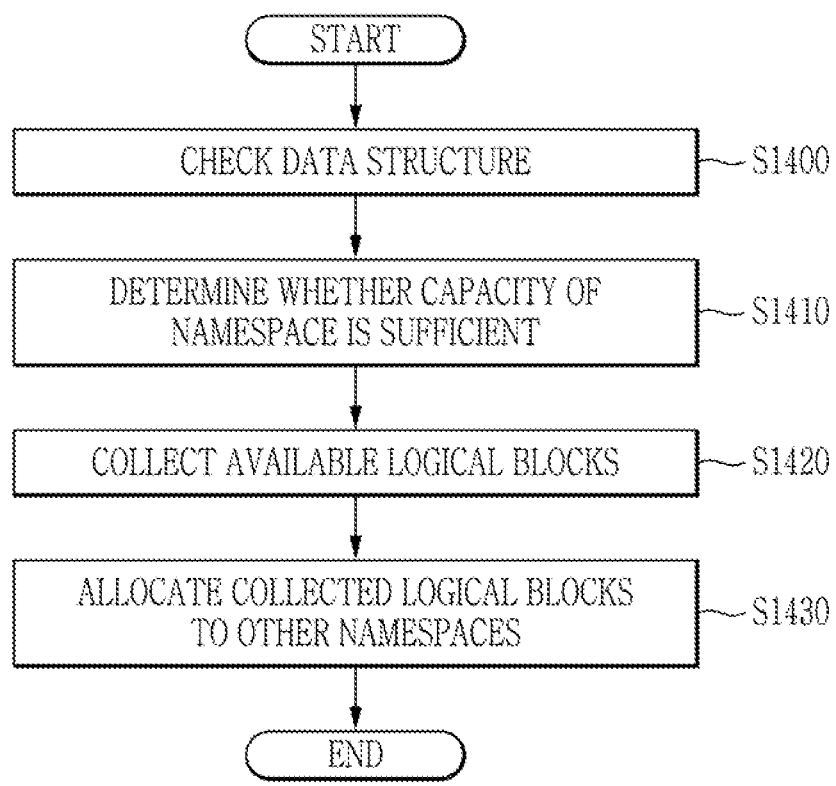
FIG. 14 is a flowchart illustrating the method of operating the storage device according to an exemplary embodiment.
Figure 15:
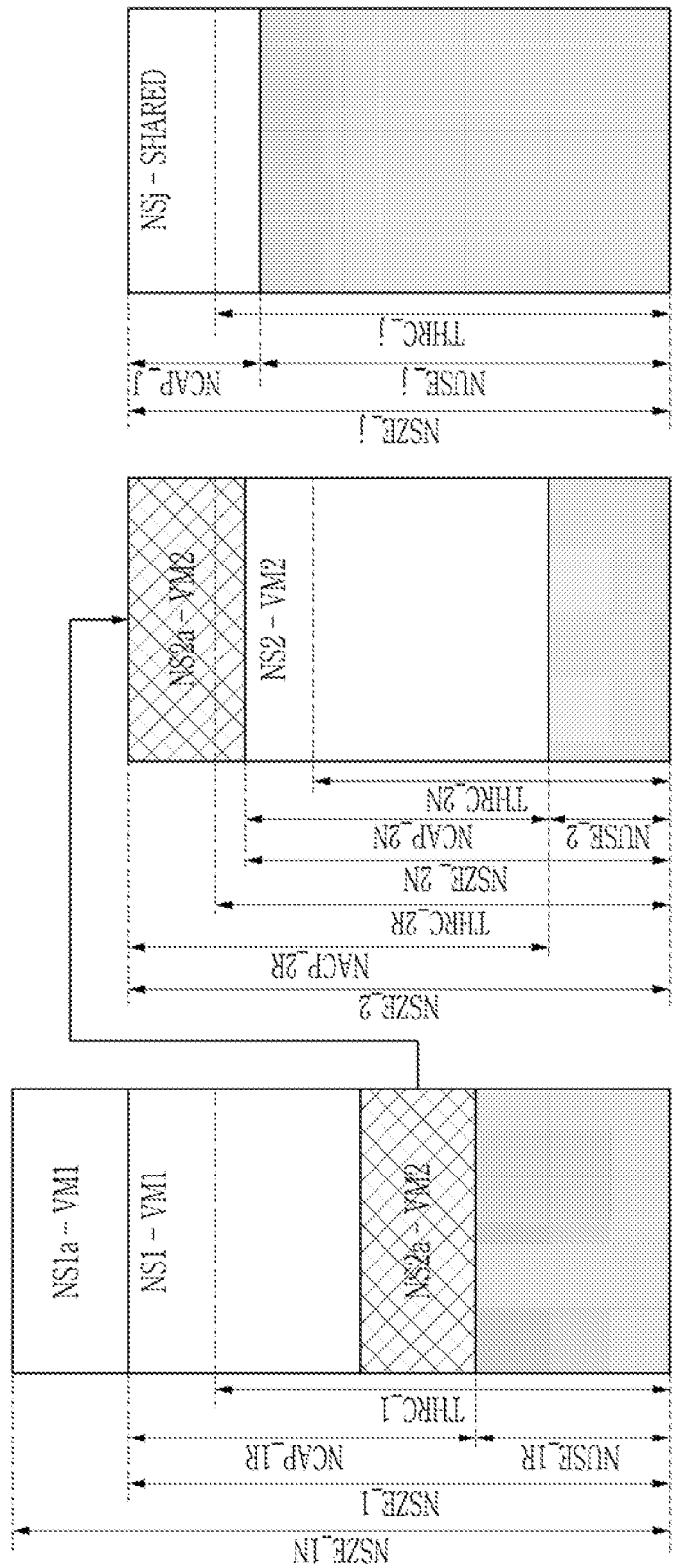
FIG. 15 is a diagram illustrating the method of operating the storage device according to an exemplary embodiment.

FIG. 14 is a flowchart illustrating the method of operating the storage device according to the exemplary embodiment and FIG. 15 is a diagram illustrating the method of operating the storage device according to the exemplary embodiment.

Referring to FIG. 14, the resource manager 830 checks the data structure of the namespace (S1400). The resource manager 830 may receive information on the non-volatile memory through the flash interface 860 to check the data structure of the namespace. Operation S1400 may be substantially the same as or similar to operation S900 of FIG. 9. In addition, operation S1400 may also be performed as one operation together with operation S900.

Next, the resource manager 830 determines whether the capacity of the namespace is sufficient (S1410). Operation S1410 may be performed as one operation together with operation S910 of FIG. 9.

In the exemplary embodiment, the resource manager 830 may determine whether a capacity of a namespace using logical blocks of another namespace is sufficient.

Referring to FIG. 15, the resource manager 830 may determine whether the capacity of the namespace NS1 using an allocable logical block of another namespace NS2 is sufficient. In some exemplary embodiments, the resource manager 830 may determine whether the usage rate NUSE_1R of the namespace NS1 is less than the first threshold THRC_1 set before the allocable logical block of another namespace NS2 is used. In addition, the resource manager 830 may determine whether the capacity of the namespace NS1 is sufficient in various ways in consideration of the usage rate NUSE_1R of the namespace NS1.

When the capacity of the namespace is sufficient, the resource manager 830 collects an available logical block (S1420).

In the exemplary embodiment, when the capacity of the namespace using the logical block of another namespace is sufficient, the resource manager 830 may perform garbage collection to collect allocable logical blocks.

Since the capacity of the namespace NS1 is sufficient, the resource manager 830 may secure the partial logical block NS2$a$ by performing the garbage collection.

Next, the resource manager 830 controls the collected logical blocks to be used by other namespaces (S1430). In the exemplary embodiment, the resource manager 830 may control another namespace that provides the allocable logical block to be used in the corresponding namespace to use the logical block collected in operation S1420. For example, the resource manager 830 may restore the namespace that has provided the partial logical block to another namespace to have the original capacity.

The resource manager 830 may control the partial logical block NS2$a$ collected by the namespace NS1 to be allocable to the namespace NS2. In some exemplary embodiments, the resource manager 830 may determine the capacity of the logical block NS2$a$ such that the capacity of the logical block NS2$a$ is the same as that of the logical block NS1$a$. Since the allocable logical block NS2$a$ is further included in the namespace NS2, the size of the namespace NS2 is increased from NSZE_2N to NSZE_2R, and the capacity of the namespace NS2 may also be increased from NCAP_2N to NCAP_2R. The first threshold of the namespace NS2 may also be changed from THRC_2N to THRC_2R and set. The size of the namespace NS1 may be decreased from NSZE_1N to NSZE_1, and the capacity of the namespace NS1 may also be decreased to NCAP_1R.

In the exemplary embodiment, operations S1400, S1410, S1420, and S1430 may be preferentially performed when the capacity of the namespace that provides the allocable logical block to be used in another namespace enters a state in which the capacity is insufficient. For example, when the namespace NS2 enters the state in which the capacity is insufficient, the resource manager 830 may preferentially perform operations S1400, S1410, S1420, and S1430. When the resource manager 830 is unable to perform operations S1400, S1410, S1420, and S1430, or when the capacity secured by performing operations S1400, S1410, S1420, and S1430 is insufficient, the resource manager 830 performs operations S900, S910, and S920 of FIG. 9, so that the namespace NS2 may receive the allocable logical block from the shared namespace and/or other namespaces.

According to the method of operating the storage device, according to the exemplary embodiment as described above, by dynamically adjusting the capacity of each namespace without securing the all capacities of the namespaces for each virtual machine, it is possible to efficiently use the memory resource, and it is possible to increase the utilization of the storage capacity of the storage device 120.

Next, a method of operating the storage device will be described with reference to FIGS. 16 to 19.

Figure 16:
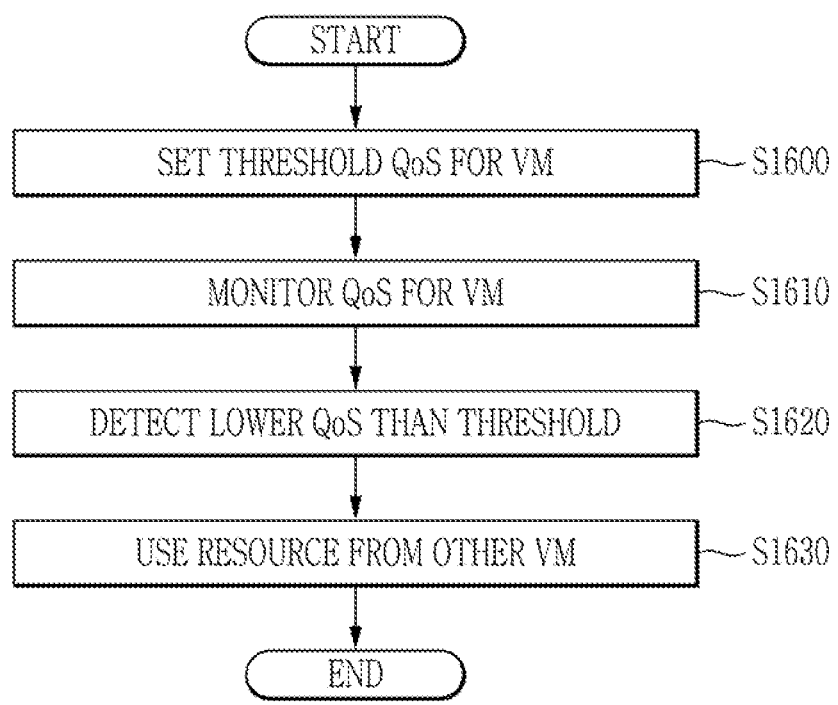
FIG. 16 is a flowchart illustrating the method of operating the storage device according to an exemplary embodiment.
Figure 17:
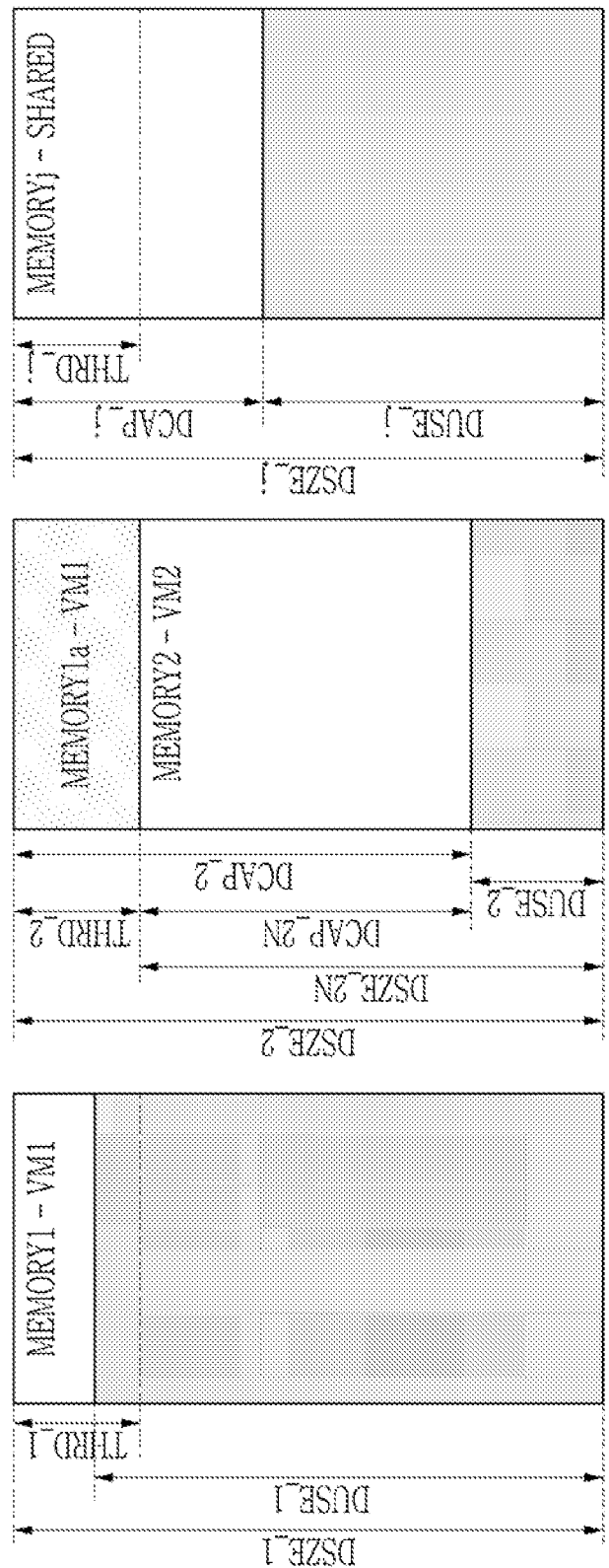
FIG. 17 is a diagram illustrating the method of operating the storage device according to an exemplary embodiment.
Figure 18:
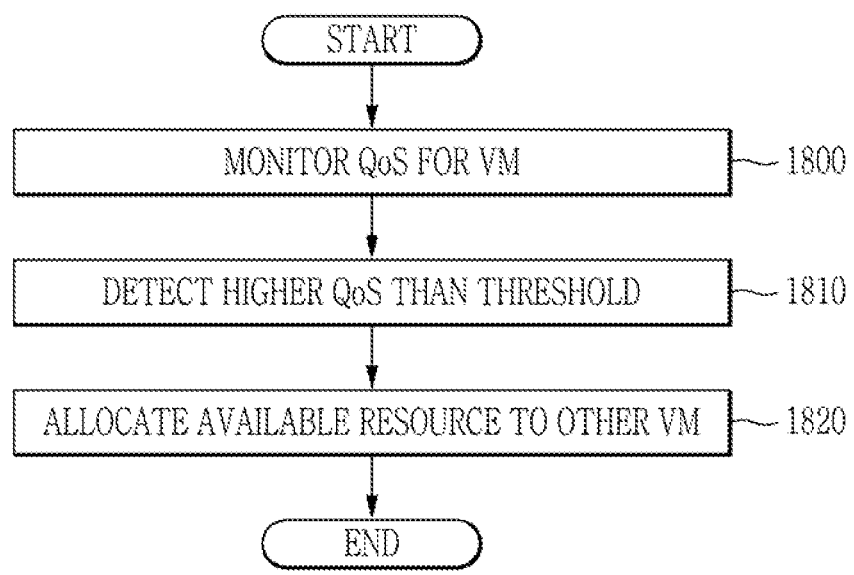
FIG. 18 is a flowchart illustrating the method of operating the storage device according to an exemplary embodiment.
Figure 19:
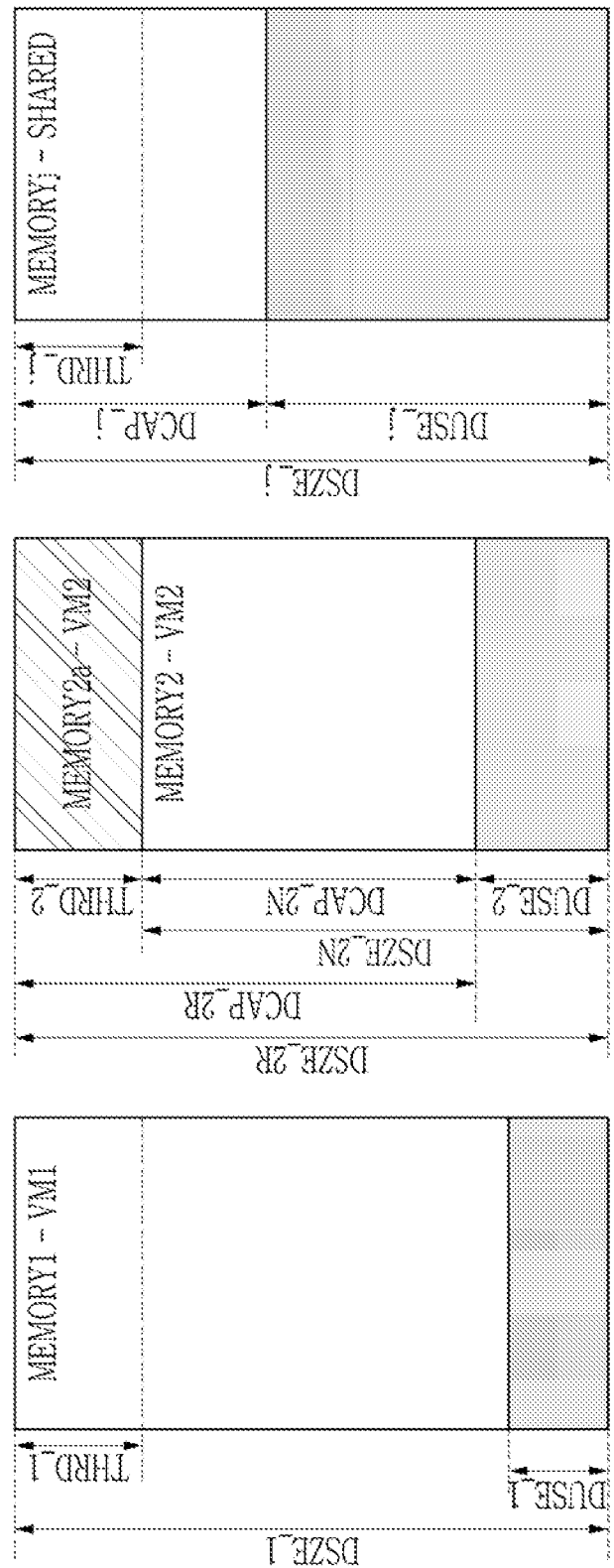
FIG. 19 is a diagram illustrating the method of operating the storage device according to an exemplary embodiment.

FIG. 16 is a flowchart illustrating the method of operating the storage device according to the exemplary embodiment, and FIG. 17, FIG. 18, and FIG. 19 are diagrams illustrating the method of operating the storage device according to the exemplary embodiment.

Referring to FIG. 16, the resource manager 830 sets a threshold QoS for the virtual machine (S1600). The threshold QoS for the virtual machine may be determined based on the lowest QoS for the virtual machine. The storage device may operate to satisfy the lowest QoS for each virtual machine. In the exemplary embodiment, QoS for the virtual machine may be calculated based on throughput, memory latency, and bit rate between the virtual machine and the storage device. For example, the threshold QoS for the virtual machine may be set to 110% of the lowest QoS for the virtual machine. The resource manager 830 may set a threshold QoS for each virtual machine.

The resource manager 830 monitors the QoS for the virtual machine (S1610). For example, the resource manager 830 may quantitatively calculate the QoS for each virtual machine, by using minimum bandwidth, maximum bandwidth, minimum read requests per second, maximum read requests per second, minimum bytes read per second, maximum bytes read per second, minimum write requests per second, maximum write requests per second, minimum number of bytes written per second, maximum number of bytes written per second, and the like. Hereinafter, it is assumed that the QoS is calculated based on throughput.

The resource manager 830 detects a virtual machine having a QoS lower than the threshold QoS (S1620). The resource manager 830 may compare the QoS for each virtual machine with the threshold QoS of each virtual machine.

The resource manager 830 controls the virtual machine having a QoS lower than the threshold QoS to use a resource of another virtual machine (S1630). The resource manager 830 may control the resource of the memory area used by the virtual machine having a relatively high QoS, among the plurality of memory areas to be allocable to the virtual machine having a QoS lower than the threshold QoS. The resource manager 830 may detect the size and free space of each of the plurality of memory areas. In some exemplary embodiments, the resource manager 830 may detect a memory area in which free space of an arbitrary memory area is greater than or equal to a predetermined ratio (for example, 20%) of the size of the corresponding memory area.

Referring to FIG. 17, the buffer memory may be divided into a plurality of memory areas MEMORY1, MEMORY2, and MEMORYj. Some MEMORY1 and MEMORY2 of the plurality of memory areas MEMORY1, MEMORY2, and MEMORYj may be allocated to the virtual machines VM1 and VM2, and another portion MEMORYj may be shared by the virtual machines (SHARED).

The resource manager 830 may set second thresholds THRD_1, THRD_2, and THRD_j of the plurality of memory areas MEMORY1, MEMORY2, and MEMORYj. The second thresholds s THRD_1, THRD_2, and THRD_j may be set to predetermined ratios of the sizes DSZE_1, DSZE_2, and DSZE_j of the plurality of memory areas MEMORY1, MEMORY2, and MEMORYj. For example, the second threshold THRD_1 of the memory area MEMORY1 may have a capacity of 20% of the size DSZE_1 of the memory area MEMORY). The resource manager 830 may detect memory areas MEMORY2 and MEMORYj in which free space is greater than or equal to the second thresholds THRD_2 and THRD_j, among the plurality of memory areas MEMORY1, MEMORY2, and MEMORYj. The resource manager 830 may detect memory areas MEMORY2 and MEMORYJ having sufficient free space DCAP_2 and DCAPJ, among the plurality of memory areas MEMORY1, MEMORY2, and MEMORYj. For example, the resource manager 830 may detect a memory area in which the free space of an arbitrary memory area is greater than or equal to a predetermined ratio (for example, 20%) of the size of the corresponding memory area.

The virtual machine (for example, VM1) with a QoS lower than the threshold QoS may be in a state (for example, 80% or more) with a high usage rate DUSE1 of the memory area MEMORY) allocated to the virtual machine VM1. The virtual machine (for example, VM2) with a QoS higher than the threshold QoS may be in a low state (for example, less than 80%) of the usage rate DUSE2 of the memory area MEMORY2 allocated to the virtual machine VM2. In order to guarantee the QoS for the virtual machine VM1, the resource manager 830 may control partial free space MEMORY1a of the memory area MEMORY2 to be used for the virtual machine VM1.

In addition, since the QoS is not determined only by the usage rate of the memory area, the usage rate of the memory area allocated to the virtual machine VM1 having the QoS lower than the threshold QoS may be low. Even in this case, in order to guarantee the QoS for the virtual machine VM1, the resource manager 830 may control to use the partial free space MEMORY1a of the memory area MEMORY2 for the virtual machine VM1.

In addition, in order to guarantee the QoS for the virtual machine VM1, the resource manager 830 may control partial free space DCAP_j of the memory area MEMORYj to be used for the virtual machine VM1.

For example, the resource manager 830 may monitor the performance of the virtual machine and reconfigure resource allocation as needed in order to ensure compliance with QoS requirements.

Next, a method of operating the storage device will be described with reference to FIGS. 18 and 19.

FIG. 18 is a flowchart illustrating the method of operating the storage device according to the exemplary embodiment and FIG. 19 is a diagram illustrating the method of operating the storage device according to the exemplary embodiment.

Referring to FIG. 18, the resource manager 830 monitors QoS for the virtual machine (S1810). Operation S1800 may be substantially the same as or similar to operation S1610 of FIG. 16. In addition, operation S1800 may also be performed as one operation together with operation S1610.

Next, the resource manager 830 determines whether the QoS of the virtual machine is higher than the threshold QoS (S1810). Operation S1810 may be performed as one operation together with operation S1620 of FIG. 16. The resource manager 830 may determine whether QoS for a virtual machine using a memory area of another virtual machine is higher than the threshold QoS.

When the QoS of the virtual machine is higher than the threshold QoS, the resource manager 830 controls the memory area of the virtual machine to be used by another virtual machine (S1820). In the exemplary embodiment, the resource manager 830 may restore another memory area that has provided the free space to be used by another virtual machine to have the original free space.

Referring to FIG. 19, the resource manager 830 may control the memory area MEMORY2$a$ used by the virtual machine VM1 to be returned to the memory area MEMORY2 of the virtual machine VM2. Since the memory area MEMORY2$a$ is further included in the memory area MEMORY2, the size of the memory area MEMORY2 may be increased from DSZE_2N to DSZE_2R, and the free space of the memory area MEMORY2 may also be increased from DCAP_2N to DCAP_2R.

In the exemplary embodiment, operations S1800, S1810, and S1820 are performed preferentially when the QoS of the virtual machine VM2 that has provided the allocable free space to be available to other virtual machines enters a state lower than the threshold QoS. When operations S1800, S1810, and S1820 cannot be performed, or when the free space secured by performing operations S1800, S1810, and S1820 is insufficient, the resource manager 830 may receive an allocable free space from the shared memory area of the virtual machine VM2 and/or other memory areas by performing operations S1600, S1610. S1620, and S1630 of FIG. 16.

According to the method of operating the storage device, according to the exemplary embodiment as described above, by dynamically adjusting the capacity of each memory area even without securing all the free space of the memory for each virtual machine, it is possible to efficiently use the memory resource, and it is possible to increase the utilization of the storage capacity of the storage device 120.

Figure 20:
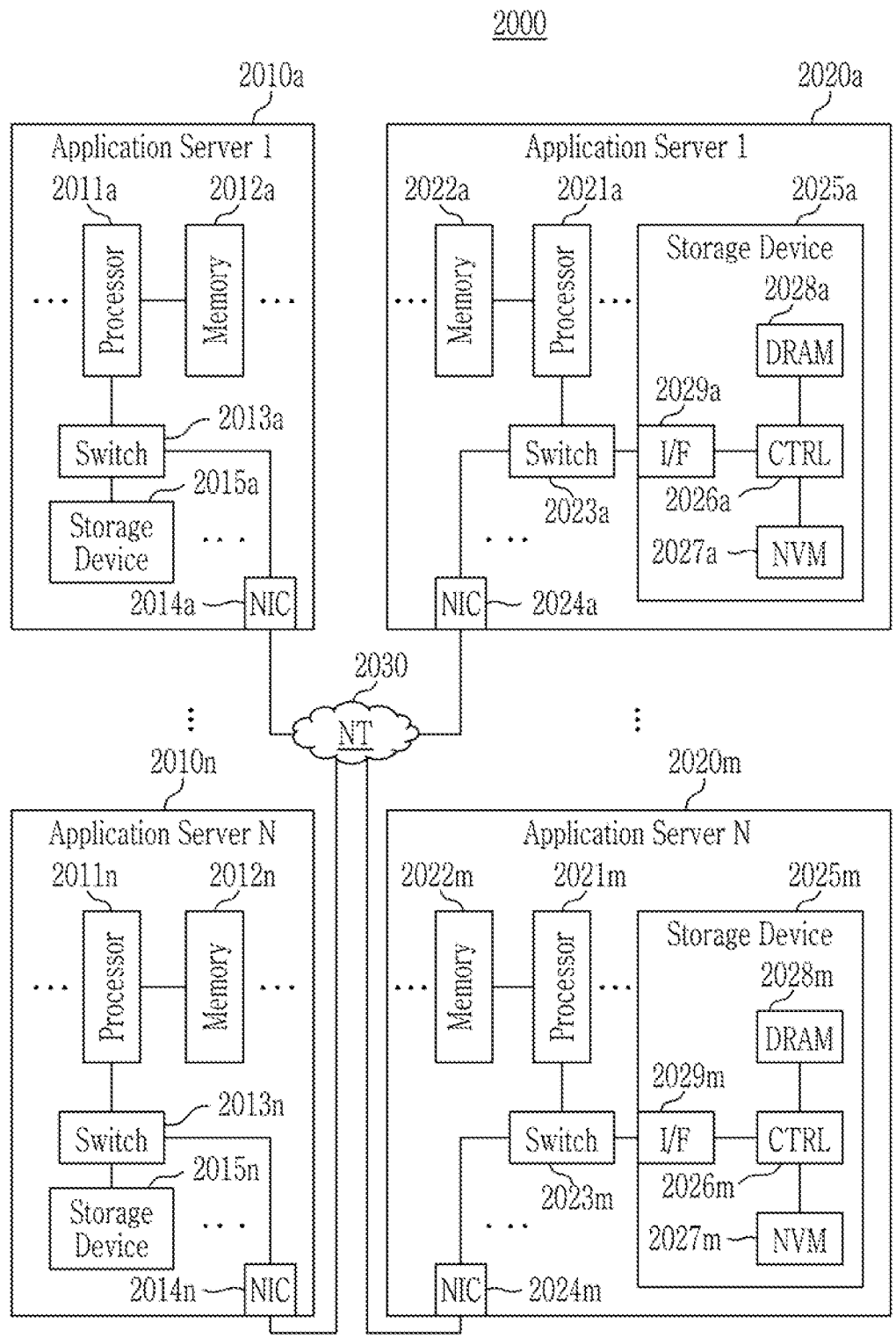
FIG. 20 is a block diagram illustrating a data center to which the storage system according to an exemplary embodiment is applied.

FIG. 20 is a block diagram illustrating a data center to which the storage system according to the exemplary embodiment is applied.

Referring to FIG. 20, a data center 2000 may be a facility that collects various types of data and provides services, and may also be referred to as a data storage center. The data center 2000 may be a system for operating a search engine and a database, and may be a computing system used in an enterprise, such as a bank, or a government institution. The data center 2000 may include application servers 2010$a$, . . . , 2010$n$ and storage servers 2020$a$, . . . , 2020$m$. The number of application servers 2010$a$, . . . , 2010$n$ and the number of storage servers 2020$a$, . . . , 2020$m$ may be variously selected according to the exemplary embodiment, and the number of application servers 2010$a$, . . . , 2010$n$ and the number of storage servers 2020$a$, . . . , 2020$m$ may be different from each other.

The application server 2010 or the storage server 2020 may include a processor 2011, processor 2021, memory 2012, and/or memory 2022. When the storage server 2020 is described as an example, a processor 2021 may control the overall operation of the storage server 2020, and access the memory 2022 to execute instructions and/or data loaded into the memory 2022. The memory 2022 may be Double Data Rate (DDR) Synchronous DRAM (SDRAM), High Bandwidth Memory (HBM), Hybrid Memory Cube (HMC), Dual In-line Memory Module (DIMM), Optane DIMM, or Non-Volatile DIMM (NVMDIMM). According to the exemplary embodiment, the number of processors 2021 and the number of memories 2022 included in the storage server 2020 may be variously selected. In the exemplary embodiment, the processor 2021 and the memory 2022 may provide a processor-memory pair. In the exemplary embodiment, the number of processors 2021 and the number of memories 2022 may be different from each other. The processor 2021 may include a single-core processor or a multi-core processor. The above description of the storage server 2020 may be similarly applied to the application server 2010. According to the exemplary embodiment, the application server 2010 might not include the storage device 2015. The storage server 2020 may include at least one storage devices 2025. The number of storage devices 2025 included in the storage server 2020 may be variously selected according to exemplary embodiments.

The application servers 2010$a$, . . . , 2010$n$ and the storage servers 2020$a$, . . . , 2020$m$ may communicate with each other through a network 2030. The network 2030 may be implemented by using Fiber Channel (FC) or Ethernet. In this case, FC is a medium used for relatively high-speed data transmission, and an optical switch providing high performance/high availability may be used. Depending on the access method of the network 2030, the storage servers 2020$a$, . . . , 2020$m$ may be provided as file storage, block storage, or object storage.

In the exemplary embodiment, the network 2030 may be a storage dedicated network, such as a storage area network (SAN). For example, the SAN may be an FC-SAN that uses an FC network and is implemented according to FC Protocol (FCP). In an example, the SAN may be an IP-SAN that uses a TCP/IP network and is implemented according to an iSCSI (SCSI over TCP/IP or Internet SCSI) protocol. In other exemplary embodiments, the network 2030 may be a general network, such as a TCP/IP network. For example, the network 2030 may be implemented according to protocols, such as FC over Ethernet (FCoE), Network Attached Storage (NAS), and NVMe over Fabrics (NVMe-oF).

Hereinafter, the application server 2010 and the storage server 2020 will be mainly described. The description of the application server 2010 may also be applied to other application servers 2010$n$, and the description of the storage server 2020 may also be applied to other storage servers 2020$m$.

The application server 2010 may store data requested to be stored by a user or a client in one of the storage servers 2020$a$, . . . , 2020$m$ through the network 2030. Also, the application server 2010 may obtain the data requested for reading by the user or the client from one of the storage servers 2020a, . . . , 2020m through the network 2030. For example, the application server 2010 may be implemented as a web server or Database Management System (DBMS).

The application server 2010 may access the memory 2012n or the storage device 2015n included in another application server 2010n through the network 2030, or access the memory 2022a, . . . , 2022m or the storage devices 2025a, . . . , 2025m included in the storage servers 2020a, . . . , 2020m through the network 2030. Accordingly, the application server 2010 may perform various operations on data stored in the application servers 2010a, . . . , 2010n and/or the storage servers 2020a, . . . , 2020m. For example, the application server 2010 may execute an instruction for moving or copying data between the application servers 2010a, . . . , 2010n and/or the storage servers 2020a, . . . , 2020m. In this case, the data may be moved from the storage devices 2025a, . . . , 2025m of the storage servers 2020a . . . , 2020m to the memories 2012a, . . . , 2012n of the application servers 2010a, . . . , 2010n directly or through the memories 2022a, . . . , 2022m of the storage servers 2020a, . . . , 2020m. The data moving through the network 2030 may be data encrypted for security or privacy.

When the storage server 2020 is described as an example, an interface 2029 may provide a physical connection between the processor 2021 and a controller 2026 and a physical connection between the NIC 2024 and the controller 2026. For example, the interface 2029 may be implemented in a Direct Attached Storage (DAS) method for directly connecting the storage device 2025 with a dedicated cable. Also, for example, the interface 2029 may be implemented in various interface methods, such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, Universal Serial Bus (USB), Secure Digital (SD) card, Multi-Media Card (MMC), Embedded Multi-Media Card (eMMC), Universal Flash Storage (UFS), embedded Universal Flash Storage (eUFS), and a compact flash (CF) card interface.

The storage server 2020 may further include a switch 2023 and a NIC 2024

The switch 2023 may selectively connect the processor 2021 and the storage device 2025 or may selectively connect the NIC 2024 and the storage device 2025 under the control of the processor 2021. Similarly, the application server 2010 may further include a switch 2013 and a NIC 2014.

In the exemplary embodiment, the NIC 2024 may include a network interface card, a network adapter, and the like. The NIC 2024 may be connected to the network 2030 by a wired interface, a wireless interface, a Bluetooth interface, an optical interface, or the like. The NIC 2024 may include an internal memory, a DSP, a host bus interface, and the like, and may be connected to the processor 2021 and/or the switch 2023 through the host bus interface. The host bus interface may be implemented as one of the examples of interface 2029 described above. In the exemplary embodiment, the NIC 2024 may also be integrated with at least one of the processor 2021, the switch 2023, and the storage device 2025.

In the storage server 2020a, . . . , 2020m or the application server 2010a, . . . , 2010n, the processor may program or read the data by transmitting a command to the storage device 2015a, 2015n, 2025a, . . . , 2025m or the memory 2012a, . . . , 2012n, 2022a, . . . , 2022m. In this case, the data may be data of which the error is corrected through an ECC (Error Correction Code) engine. The data is data that has been processed by Data Bus Inversion (DBI) or Data Masking (DM), and may include Cyclic Redundancy Code (CRC) information. The data may be encrypted data for security or privacy.

The storage devices 2025a, . . . , 2025m may transmit a control signal and a command % address signal to NAND flash memory devices 2027a, . . . , 2027m in response to the read command received from the processor. Accordingly, when the data is read from the NAND flash memory devices 2027a, . . . , 2027m, a Read Enable (RE) signal may be input as a data output control signal to serve to output data to the DQ bus. A Data Strobe (DQS) may be generated by using the RE signal. The command and the address signals may be latched in a page buffer according to a rising edge or a falling edge of a Write Enable (WE) signal.

The controller 2026 may control the overall operation of the storage device 2025. In the exemplary embodiment, the controller 2026 may include Static Random Access Memory (SRAM). The controller 2026 may write data to the NAND flash 2027 in response to the write command, or may read data from the NAND flash 2027 in response to the read command. For example, the write command and/or the read command may be provided from the processor 2021 in the storage server 2020, the processor 2021m in another storage server 2020m, or the processors 2011a, . . . , 2011n in the application servers 2010a, . . . , 2010n. The DRAM 2028 may temporarily store (buffer) data to be written to the NAND flash 2027 or the data read from the NAND flash 2027. Also, the DRAM 2028 may store metadata. Here, the metadata is user data or data generated by the controller 2026 to manage the NAND flash 2027.

The storage devices 2025a, . . . , 2025m are implemented based on the storage devices according to the exemplary embodiments of the present invention described above with reference to FIGS. 1 to 19, and may be implemented to perform a driving method according to the exemplary embodiments of the present invention.

The storage devices 2025a, . . . , 2025m may adjust the capacity of the namespace by using allocable logical blocks of other namespaces according to the usage rates (or capacities) of the namespaces allocated to each virtual machine (tenant).

The storage devices 2025a, . . . , 2025m may adjust the free space of a memory area used by the virtual machine according to the QoS of each virtual machine (tenant).

The exemplary embodiments of the present invention may be usefully used in a storage device and any electronic device and system including the same. For example, the exemplary embodiments of the present invention may be more usefully applied to electronic systems, such as a Personal Computer (PC), a server computer, a data center, a workstation, a notebook computer (laptop), a cellular phone, a smart phone, an MP3 player, a Personal Digital Assistant (PDA), a Portable Multimedia Player (PMP), a digital TV, a digital camera, a portable game console, a navigation device, a wearable device, Internet of Things (IoT) devices, Internet of Everything (IoE) devices, e-books, Virtual Reality (VR) devices, Augmented Reality (AR) devices, and drones.

Although an exemplary embodiment of the present invention has been described in detail, the scope of the present invention is not necessarily limited by the exemplary embodiment. Various changes and modifications using the basic concept of the present invention defined in the accompanying claims by those skilled in the art shall be construed to belong to the scope of the present disclosure.

While this invention has been described in connection with what is presently considered to be practical exemplary embodiments, it is to be understood that the invention is not necessarily limited to the disclosed exemplary embodiments. On the contrary, it is intended to cover various modifications and equivalent arrangements included within the spirit and scope of the present disclosure.

What is claimed is:

1. A storage device, comprising:
a non-volatile memory including a plurality of namespaces including a plurality of logical blocks, wherein the plurality of namespaces are allocated to a plurality of tenants; and
a storage controller configured to, for each of the plurality of namespaces, check a capacity that is a number of allocable logical blocks, among the plurality of logical blocks, and a size that is a sum of a number of currently allocated logical blocks, among the plurality of logical blocks, and a number of allocable logical blocks, detect a first namespace allocated to a first tenant of the plurality of tenants, among the plurality of namespaces, by using the capacity and the size, and provide at least a portion of the allocable logical blocks of a second namespace allocated to a second tenant of the plurality of tenants, among the plurality of namespaces, to the first namespace.

2. The storage device of claim 1, wherein:
the storage controller sets a first ratio of the size of each of the plurality of namespaces to a first threshold, and detects a namespace having a capacity that is less than the first threshold, among the plurality of namespaces, as the first namespace.

3. The storage device of claim 2, wherein:
the storage controller determines the number of at least the portion of the allocable logical blocks of the second namespace so that the capacity of the second namespace except for at least the portion of the allocable logical blocks of the second namespace maintains at least the first threshold of the second namespace.

4. The storage device of claim 2, wherein:
the storage controller determines the number of at least the portion of the allocable logical blocks of the second namespace so that the capacity of the first namespace to which at least the portion of the allocable logical blocks of the second namespace is provided is greater than or equal to the first threshold.

5. The storage device of claim 2, wherein:
the storage controller sets a second ratio of the size of each of the plurality of namespaces to a second threshold, and detects a namespace having a capacity greater than or equal to the second threshold, among the plurality of namespaces, as the second namespace.

6. The storage device of claim 5, wherein:
the first ratio is less than the second ratio.

7. The storage device of claim 5, wherein:
when the capacity of the first namespace is greater than or equal to the second threshold, the storage controller returns at least a portion of the allocable logical blocks of the first namespace to the second namespace.

8. The storage device of claim 7, wherein:
the storage controller secures the allocable logical block of the first namespace by performing garbage collection on the first namespace.

9. The storage device of claim 7, wherein:
when the capacity of the second namespace is less than the first threshold, the storage controller detects whether the capacity of the first namespace is greater than or equal to the second threshold.

10. The storage device of claim 7, wherein:
when the capacity of the second namespace is less than the first threshold, even after returning at least the portion of the allocable logical blocks of the first namespace to the second namespace, the storage controller provides at least a portion of allocable logical blocks of a third namespace, among the plurality of namespaces, to the second namespace.

11. The storage device of claim 1, wherein:
when the storage controller receives an identification command for the plurality of namespaces from an external source, the storage controller outputs information on the capacity and information on the size of each of the plurality of namespaces.

12. The storage device of claim 1, wherein:
the plurality of namespaces includes a plurality of third namespaces allocated to a plurality of virtual machines and a fourth namespace shared by the plurality of virtual machines, and
the storage controller determines the second namespace preferentially from among the fourth namespaces over the third namespace.

13. The storage device of claim 12, further comprising:
a buffer memory having a plurality of memory areas allocated to the plurality of virtual machines,
wherein the storage controller monitors quality of service (QOS) of the plurality of virtual machines to comply with QoS requirements of the plurality of virtual machines, and reconfigures free space of the plurality of memory areas according to the monitored QoS.

14. A method of operating a storage device, the method comprising:
checking, for each of a plurality of namespaces including a plurality of logical blocks, a capacity that is a number of allocable logical blocks, among the plurality of logical blocks, and a size that is a sum of a number of currently allocated logical blocks, among the plurality of logical blocks, and the number of allocable logical blocks, wherein the plurality of namespaces are allocated to a plurality of tenants;
detecting a first namespace allocated to a first tenant of the plurality of tenants, among the plurality of namespaces, by using the capacity and the size; and
providing at least a portion of the allocable logical blocks of a second namespace allocated to a second tenant of the plurality of tenants, among the plurality of namespaces, to the first namespace.

15. The method of claim 14, wherein:
the detecting of the first namespace includes:
setting a first ratio of the size of each of the plurality of namespaces to a first threshold; and
detecting a namespace having a capacity that is less than the first threshold, among the plurality of namespaces, as the first namespace.

16. The method of claim 14, further comprising:
setting a second ratio of the size of each of the plurality of namespaces to a second threshold; and
detecting a namespace having a capacity greater than or equal to the second threshold, among the plurality of namespaces, as the second namespace.

17. The method of claim 16, further comprising:
determining whether a capacity of the first namespace provided with at least the portion of the allocable logical blocks of the second namespace is greater than or equal to the second threshold;
when the capacity of the first namespace is greater than or equal to the second threshold, securing the allocable logical block of the first namespace by performing garbage collection on the first namespace; and returning at least a portion of the allocable logical blocks of the first namespace to the second namespace.

18. A storage system, comprising:

a host device configured to execute a plurality of virtual machines; and a storage device including a plurality of namespaces allocated to the plurality of virtual machines, and configured to adjust a size of each of the plurality of namespaces based on a number of allocable logical blocks in each of the plurality of namespaces and a number of currently allocated logical blocks in each of the plurality of namespaces, wherein adjusting the size of each of the plurality of namespaces includes increasing the size of a first namespace allocated to a first virtual machine of the plurality of virtual machines and decreasing the size of a second namespace allocated to a second virtual machine of the plurality of virtual machines by the increased size of the first namespace.

19. The storage system of claim 18, wherein:

the storage device further includes a shared namespace shared by the plurality of virtual machines, and adjusts the size of each of the plurality of namespaces by using an allocable logical block of the shared namespace.

20. The storage system of claim 18, wherein:

the storage device further includes a plurality of memory areas allocated to the plurality of virtual machines, and monitors quality of service (QOS) of the plurality of virtual machines to comply with QOS requirements of the plurality of virtual machines, and reconfigures free space of the plurality of memory areas allocated to the plurality of virtual machines according to the monitored QoS.

* * * * *